United States Patent
Nomura et al.

(10) Patent No.: US 9,043,098 B2
(45) Date of Patent: May 26, 2015

(54) DISPLAY SYSTEM OF EXCAVATING MACHINE AND EXCAVATING MACHINE

(71) Applicant: Komatsu Ltd., Tokyo (JP)

(72) Inventors: Azumi Nomura, Fujisawa (JP);
Takahiro Hashimoto, Hiratsuki (JP);
Etsuo Fujita, Hirakata (JP); Ryo Fukano, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/985,451

(22) PCT Filed: Nov. 30, 2012

(86) PCT No.: PCT/JP2012/081203
§ 371 (c)(1),
(2) Date: Aug. 14, 2013

(87) PCT Pub. No.: WO2014/054194
PCT Pub. Date: Apr. 10, 2014

(65) Prior Publication Data
US 2014/0100712 A1    Apr. 10, 2014

(30) Foreign Application Priority Data

Oct. 5, 2012 (JP) ................................ 2012-223499

(51) Int. Cl.
*G06G 7/48* (2006.01)
*E02F 9/26* (2006.01)
(Continued)

(52) U.S. Cl.
CPC ... *E02F 9/26* (2013.01); *E02F 3/32* (2013.01);
*E02F 9/261* (2013.01); *E02F 9/264* (2013.01);
*G01S 19/14* (2013.01); *G01S 19/53* (2013.01)

(58) Field of Classification Search
USPC ................... 701/34.4, 50, 469, 445; 37/341;
348/222.1, 113, 118; 299/1.05;
414/696, 815, 685, 687–688;
340/995.27
See application file for complete search history.

(56) References Cited

U.S. PATENT DOCUMENTS 5,850,341 A * 12/1998 Fournier et al. ................. 701/50
8,447,072 B2 * 5/2013 Takahashi et al. ............. 382/103
(Continued)

FOREIGN PATENT DOCUMENTS

| CN | 1651666 A | 8/2005 |
|---|---|---|
| DE | 112012000106 T5 | 7/2013 |

(Continued)

OTHER PUBLICATIONS

Magnetic sensing as a position reference system for ground vehicle control; Ching-Yao Chan; Instrumentation and Measurement, IEEE Transactions on ; vol. 51 , Issue: 1; DOI: 10.1109/19.989896; Publication Year: 2002 , pp. 43-52.*
Mounting-Angle Estimation for Personal Navigation Devices; Vinande, E. ; Axelrad, P. ; Akos, D.;Vehicular Technology, IEEE Transactions on; vol. 59 , Issue: 3; DOI: 10.1109/TVT.2009. 2034667; Publication Year: 2010 , pp. 1129-1138.*
Control of the main working axes of bucket wheel excavators according to the criterion of desired capacity; Rasic, N. ; Bebic, M. ; Ristic, L. ; Jeftenic, B. ; Statkic, S.; Industrial Electronics Society, IECON 2013—39th Annual Conference of the IEEE DOI: 10.1109/IECON. 2013.6699680; Publication Year: 2013 , pp. 3433-3438.*

(Continued)

*Primary Examiner* — Cuong H Nguyen
(74) *Attorney, Agent, or Firm* — Locke Lord LLP

(57) ABSTRACT

An display system of an excavating machine includes: a vehicle condition detector detecting information related to a current position and a posture of the excavating machine having a work equipment including a bucket; a memory unit storing position information of a target surface indicating a target shape of an object to be worked; a display unit displaying the bucket and position information of a design surface and the target surface; and a processing unit calculating a position of a blade edge of the bucket based on the information related to the current position and the posture of the excavating machine, and, when at least part of the bucket enters a predetermined range in a periphery of the target surface in a direction orthogonal to the target surface, displaying a trajectory of the blade edge which is calculated based on the position of the blade edge and which exists in the predetermined range.

13 Claims, 18 Drawing Sheets

(51) Int. Cl.
*E02F 3/32* (2006.01)
*G01S 19/14* (2010.01)
*G01S 19/53* (2010.01)

(56) References Cited

U.S. PATENT DOCUMENTS

| | | | | |
|---|---|---|---|---|
| 8,903,604 | B2 * | 12/2014 | Fukano et al. | 701/36 |
| 8,914,199 | B2 * | 12/2014 | Nomura et al. | 701/50 |
| 2005/0027420 | A1 * | 2/2005 | Fujishima et al. | 701/50 |
| 2006/0041361 | A1 * | 2/2006 | Matrosov | 701/50 |
| 2008/0204548 | A1 * | 8/2008 | Goulanian et al. | 348/51 |
| 2010/0066850 | A1 * | 3/2010 | Wilson et al. | 348/222.1 |
| 2012/0057749 | A1 * | 3/2012 | Takahashi et al. | 382/103 |
| 2012/0275004 | A1 * | 11/2012 | Goulanian et al. | 359/210.1 |
| 2013/0038714 | A1 * | 2/2013 | Ichinose et al. | 348/118 |
| 2013/0038956 | A1 * | 2/2013 | Matsumoto et al. | 359/857 |
| 2013/0103247 | A1 * | 4/2013 | Ogawa et al. | 701/23 |
| 2013/0158786 | A1 * | 6/2013 | Fukano et al. | 701/34.4 |
| 2013/0158787 | A1 * | 6/2013 | Nomura et al. | 701/34.4 |
| 2014/0064897 | A1 * | 3/2014 | Montgomery | 414/685 |

FOREIGN PATENT DOCUMENTS

| | | | |
|---|---|---|---|
| DE | 112012000296 | T5 * | 8/2014 |
| JP | 2009-150218 | A | 7/2009 |
| JP | 5054833 | B2 * | 10/2012 |
| JP | 5426743 | B1 * | 2/2014 |
| KR | 2013044338 | A * | 5/2013 |
| WO | WO-2012/114869 | A1 | 8/2012 |
| WO | WO 2012114872 | A1 * | 8/2012 |
| WO | WO 2014054193 | A1 * | 4/2014 |

OTHER PUBLICATIONS

Dragline automation; Ridley, P. ; Corke, P.; Robotics and Automation, 2001. Proceedings 2001 ICRA. IEEE International Conference on; vol. 4; DOI: 10.1109/ROBOT.2001.933200; Publication Year: 2001 , pp. 3742-3747 vol. 4.*

Position accommodation and compliance control for robotic excavation; Richardson-Little, W. ; Damaren, C.J.; Control Applications, 2005. CCA 2005. Proceedings of 2005 IEEE Conference on; DOI: 10.1109/CCA.2005.1507293; Publication Year: 2005 , pp. 1194-1199.*

Development of autonomous excavation technology for hydraulic excavators; Yamamoto, H. ; Moteki, M. ; Shao, H. ; Ootuki, T. ICCAS-SICE, 2009; Publication Year: 2009 , pp. 2226-2229.*

Electricity applied to single-bucket excavators; Durand, P.H.R.; Electrical Engineers—Part II: Power Engineering, Journal of the Institution of; vol. 89 , Issue: 12; DOI: 10.1049/ji-2.1942.0096; Publication Year: 1942 , pp. 585-604.*

Control of virtual excavating system base on real-time simulation; Quang Hoan Le ; Young-man Jeong ; Chi Thanh Nguyen ; Soon-Yong Yang; Control, Automation and Systems (ICCAS), 2012 12th International Conference on; Publication Year: 2012 , pp. 703-707.*

Cobalt-Rich Crust Mining by Continuous Line Bucket; Masuda, Y.; OCEANS '87; DOI: 10.1109/OCEANS.1987.1160701 Publication Year: 1987 , pp. 1021-1026.*

Motion trajectory study in the scooping operation of an LHD-loader; Hemami, A.; Industry Applications, IEEE Transactions on vol. 30 , Issue: 5; DOI: 10.1109/28.315248; Publication Year: 1994 , pp. 1333-1338.*

* cited by examiner

DISPLAY SYSTEM OF EXCAVATING MACHINE AND EXCAVATING MACHINE

FIELD

The present invention relates to an display system of an excavating machine and an excavating machine which includes this display system of the excavating machine.

BACKGROUND

Generally, an excavating machine such as an excavator excavates, for example, a ground of an object to be worked when an operator operates an operation lever to drive a work equipment including a bucket. For example, Patent Literature 1 discloses a technique of enabling a trajectory of the depth of blade edges of a bucket upon dredging by a backhoe dredging boat to be maintained on a monitor display for a short period of time.

CITATION LIST

Patent Literature

Patent Literature 1: Japanese Patent Laid-open No. 2009-150218

SUMMARY

Technical Problem

With part of a design surface of a construction work target being set as a target surface, when an excavator excavates a ground of an object to be worked according to this target surface, an operator of the excavating machine needs information about the vicinity of the target surface in particular. According to the technique disclosed in Patent Literature 1, the trajectory of the blade edges from a shallow position to a target dredge depth, and therefore a screen of a display device also displays information other than information about the vicinity of the target surface. Hence, the technique of Patent Literature 1 is likely to be incapable of intelligibly providing information related to a construction work result to an operator of the excavating machine when part of a design surface of a construction work target is set as a target surface and the operator excavates a ground of an object to be worked according to this target surface.

An object of the present invention is to intelligibly provide information related a construction work result to an operator when an operator of an excavating machine proceeds with construction work according to a design surface.

Solution to Problem

According to the present invention, a display system of an excavating machine, the excavating machine comprising a work equipment including a bucket and a main body which is attached to the work equipment, the display system comprises: a vehicle condition detection unit which detects information related to a current position and a posture of the excavating machine; a memory unit which stores position information of a design surface of an object to be worked and position information of a target surface indicating a target shape; a display unit which displays the bucket and position information of the design surface and the target surface, on a screen; and a processing unit which calculates a position of a blade edge of the bucket based on the information related to the current position and the posture of the excavating machine, and, when at least part of the bucket enters a predetermined range in a periphery of the target surface in a direction orthogonal to the target surface, displays a trajectory of the blade edge which is calculated based on the position of the blade edge and which exists in the predetermined range, on the screen of the display unit.

In the present invention, it is preferable that when the bucket reenters the predetermined range after the bucket goes out of the predetermined range, the processing unit erases the trajectory of the blade edge which has already been displayed, and displays on the screen the trajectory of the blade edge of the bucket which has reentered the predetermined range.

In the present invention, it is preferable that based on a positional relationship between the bucket and a predetermined range which is a space which widens in a direction vertical to the target surface and includes an excavation range by the bucket, the processing unit erases at least part of the trajectory.

In the present invention, it is preferable that the predetermined range which includes the excavation range is larger than a width of the bucket.

In the present invention, it is preferable that based on rotation of an upper swing body on which the work equipment is mounted, the processing unit erases at least part of the trajectory.

In the present invention, it is preferable that based on movement of the main body, the processing unit erases at least part of the trajectory.

In the present invention, it is preferable that when target surface is no longer an object to be worked or when the target surface is changed, the processing unit erases the trajectory displayed on the screen of the display unit.

In the present invention, it is preferable that a size of the predetermined range is changeable.

In the present invention, it is preferable that the size of the predetermined range comprises a size corresponding to a tolerance when construction work is conducted according to the design surface.

In the present invention, it is preferable that based on a distance between the blade edge of the bucket and the target surface or the design surface, the processing unit broadcasts a sound as an alarm.

In the present invention, it is preferable that based on a distance between the blade edge of the bucket and the target surface or the design surface, the processing unit changes a mode of broadcasting the sound.

In the present invention, it is preferable that the processing unit displays a guidance indicator which indicates the position of the blade edge of the bucket, on the screen of the display unit.

According to the present invention, an excavating machine comprises the display system of the excavating machine.

The present invention can intelligibly provide information related to a construction work result to an operator when an operator of an excavating machine proceeds with construction work according to a design surface.

BRIEF DESCRIPTION OF DRAWINGS

FIG. 20 is a view illustrating a relationship between the bucket 8 and a horizontal direction predetermined range AS.

FIG. 21 is a view illustrating a relationship between the bucket 8 and the horizontal direction predetermined range AS.

FIG. 22 is a view illustrating a relationship between the bucket 8 and the horizontal direction predetermined range AS.

FIG. 23-1 is a view for describing a predetermined range which is a space which widens in a direction vertical to the target surface 70, and which includes an excavation range of the target surface 70 by the bucket 8.

FIG. 23-2 is a view for describing a predetermined range which is a space which widens in a direction vertical to the target surface 70, and which includes an excavation range of the target surface 70 by the bucket 8.

FIG. 24-1 is a view illustrating a relationship between the bucket 8 and the horizontal direction predetermined range AS.

FIG. 24-2 is a view illustrating a relationship between the bucket 8 and the horizontal direction predetermined range AS.

DESCRIPTION OF EMBODIMENTS

A mode (embodiment) for implementing the present invention will be described in detail with reference to the drawings. Content disclosed in the following embodiment by no means limits the present invention. Further, although an excavator will be described as an example of an excavating machine with the following embodiment, the excavating machine at which the following embodiment targets is by no means limited to the excavator as long as the excavating machine has an excavating or backfilling function.

<Entire Configuration of Excavating Machine>

Figure 1:
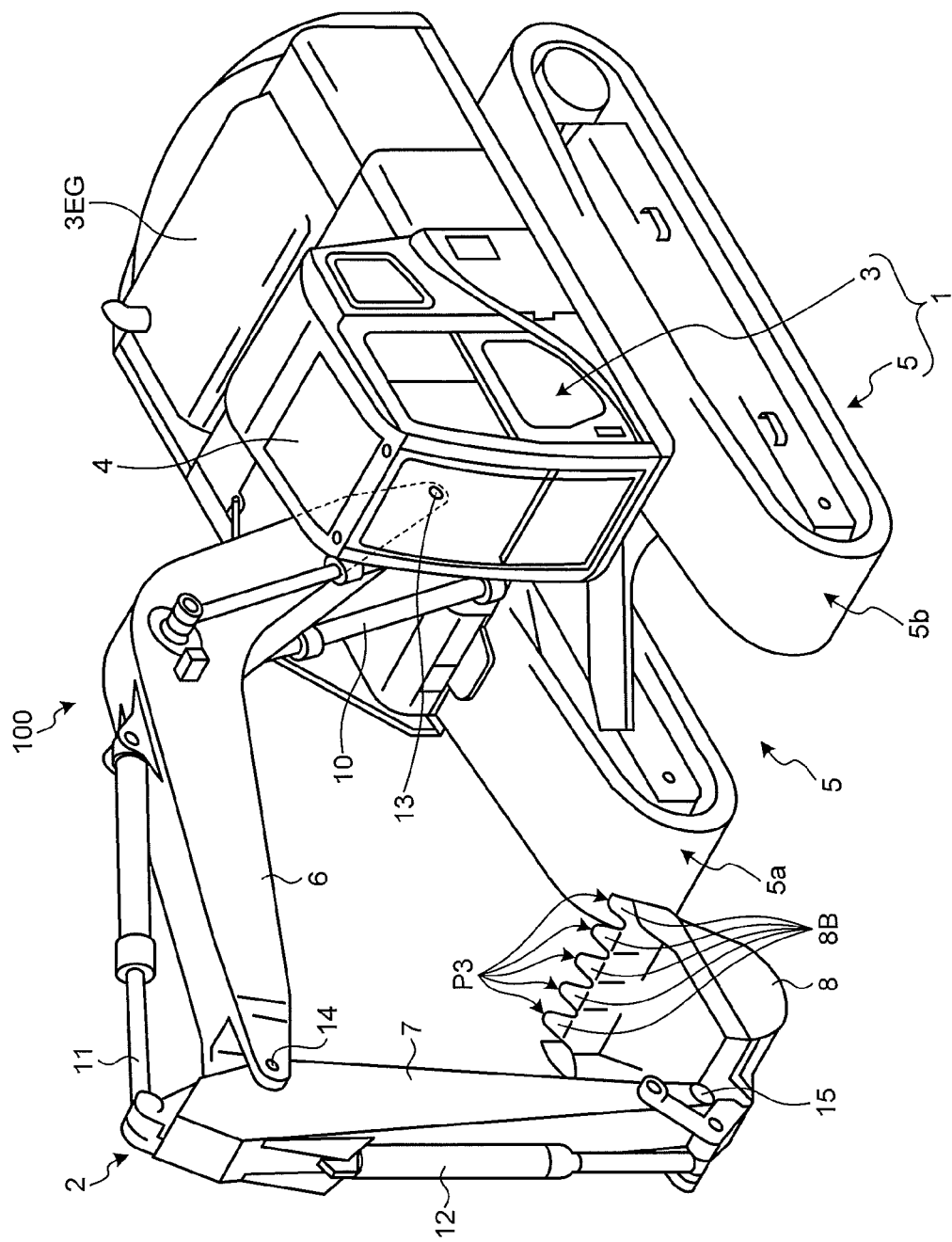
FIG. 1 is a perspective view illustrating an excavator 100 according to the present embodiment.
Figure 2:
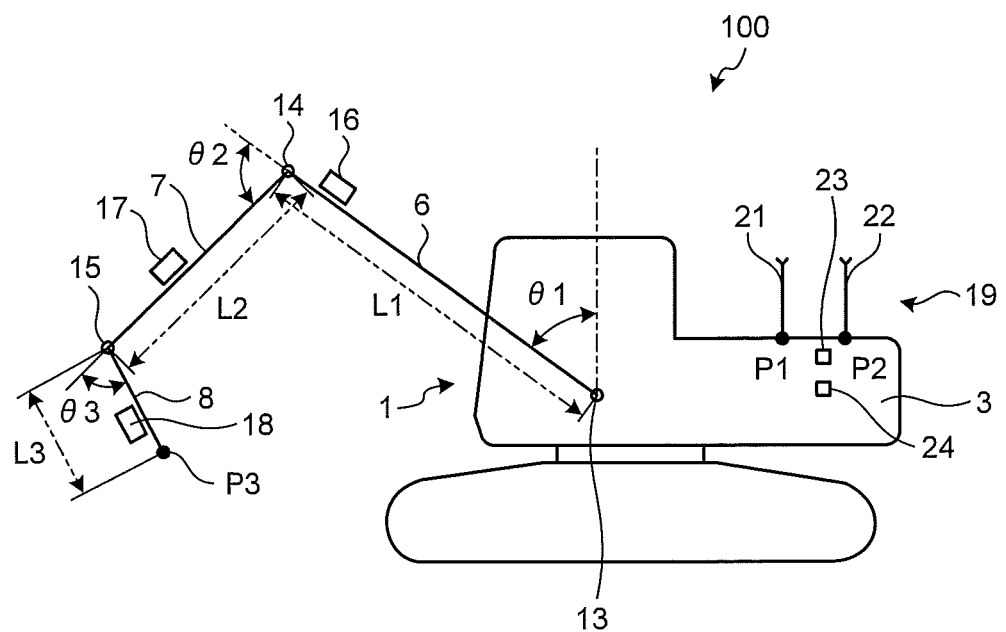
FIG. 2 is a side view of the excavator 100.
Figure 3:
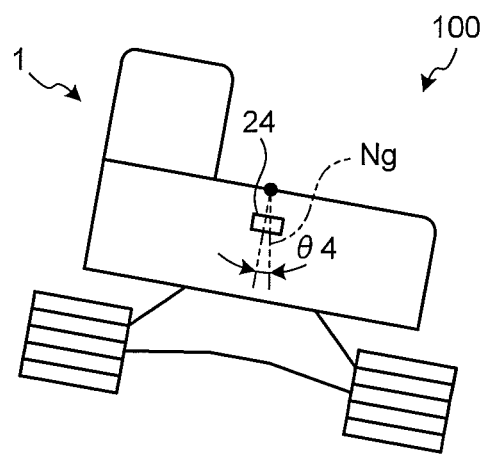
FIG. 3 is rear view of the excavator 100.
Figure 4:
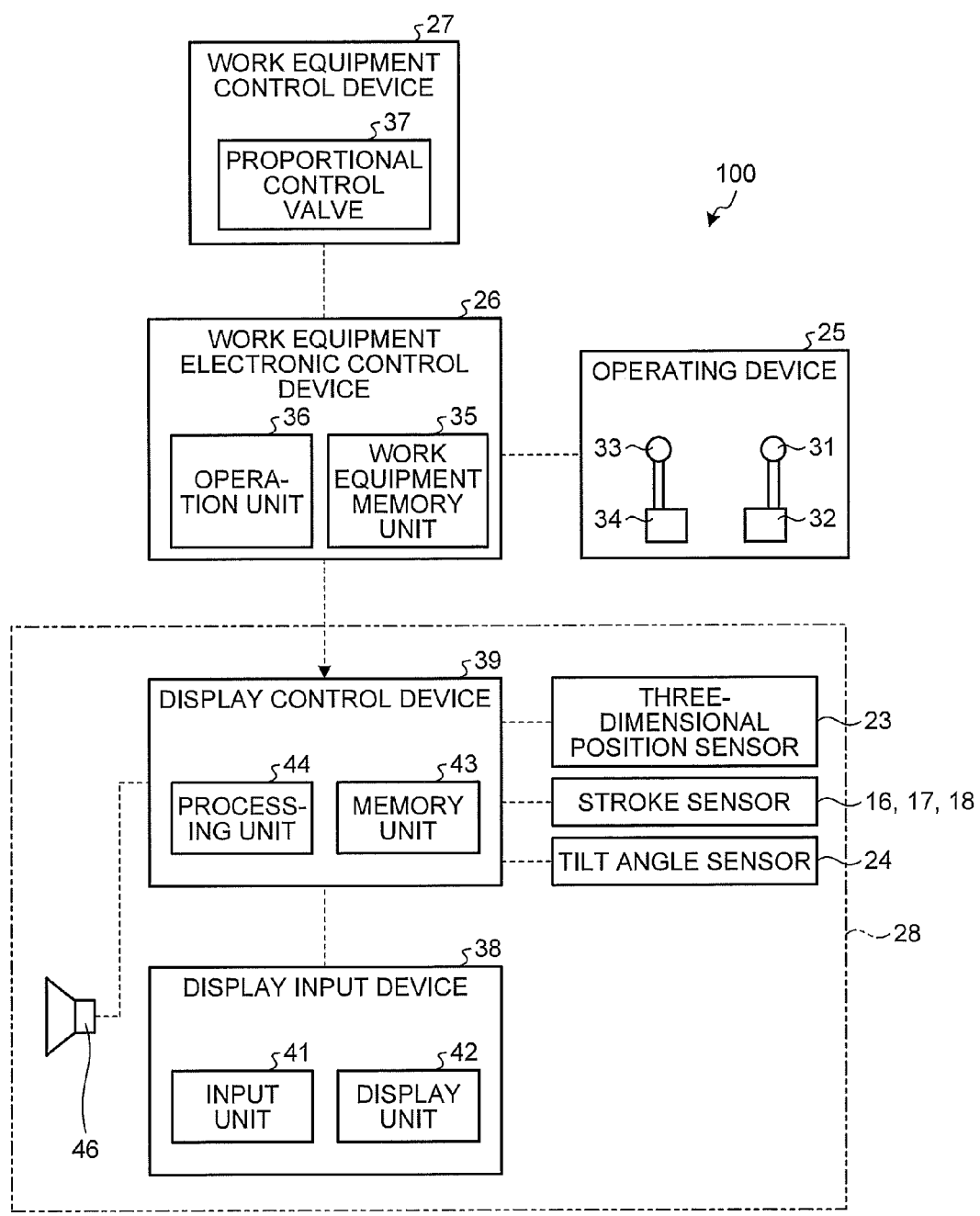
FIG. 4 is a block diagram illustrating a control system included in the excavator 100.
Figure 5:
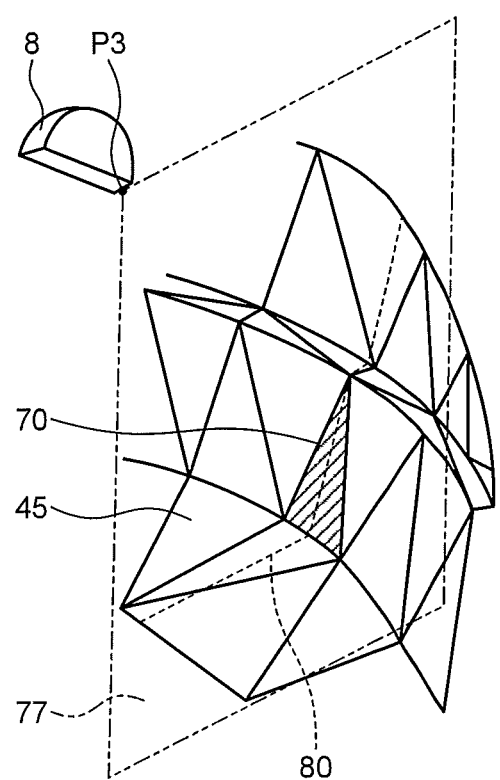
FIG. 5 is a view illustrating a design geography indicated by design geography data.

FIG. 1 is a perspective view illustrating an excavator 100 according to the present embodiment. FIG. 2 is a side view of the excavator 100. FIG. 3 is rear view of the excavator 100. FIG. 4 is a block diagram illustrating a control system included in the excavator 100. FIG. 5 is a view illustrating a design geography indicated by design geography data. In the present embodiment, the excavator 100 as an excavating machine includes a vehicle main body 1 which is a main body, and a work equipment 2. The vehicle main body 1 includes an upper swing body 3 and a traveling device 5. Inside an engine room 3EG power generating device and a device such as a hydraulic pump which are not illustrated are accommodated. The engine room 3EG is arranged at one end side of the upper swing body 3.

Although the excavator 100 uses an internal-combustion engine such as a diesel engine as a power generating device in the present embodiment, the excavator 100 is not limited to this. The excavator 100 may be equipped with, for example, a so-called hybrid power generating device formed by combining an internal-combustion engine, a generator motor and an electric storage device.

The upper swing body 3 has a cab 4. The cab 4 is placed on the other end side of the upper swing body 3. That is, the cab 4 is arranged on an opposite side to a side on which the engine room 3EG is arranged. In the cab 4, a display input device 38 and an operating device 25 illustrated in FIG. 4 are arranged. These devices will be described below. The traveling device 5 has crawler tracks 5a and 5b. The traveling device 5 travels the excavator 100 by driving a hydraulic motor which is not illustrated, and rotating the crawler tracks 5a and 5b. The work equipment 2 is attached to a lateral side of the cab 4 of the upper swing body 3.

In addition, the excavator 100 may have a traveling device which has tires instead of the crawler tracks 5a and 5b, and which can travel by transmitting a driving force of a diesel engine which is not illustrated, to the tires through a transmission. For example, the excavator 100 of this mode may be a wheel excavator. Further, the excavator 100 may be a backhoe loader which has such a traveling device which has tires, in which a work equipment is attached to a vehicle main body (main body) and which adopts a structure without an upper swing body and a rotation mechanism as illustrated in FIG. 1. That is, the backhoe loader has the traveling device in which the work equipment is attached to the vehicle main body to form part of the vehicle main body.

With the upper swing body 3, a side on which the work equipment 2 and the cab 4 are arranged is the front, and a side on which the engine room 3EG is arranged is the rear. The left side when facing the front is the left of the upper swing body 3 and a right side when facing the front is the right of the upper swing body 3. Further, with the excavator 100 or the vehicle main body 1, the traveling device 5 side based on the upper swing body 3 is a lower side, and the upper swing body 3 side based on the traveling device 5 is an upper side. When the excavator 100 is placed on a horizontal surface, the lower side is a vertical direction, that is, a direction of application of gravity, and the upper side is an opposite side to the vertical direction.

The work equipment 2 has a boom 6, an arm 7, a bucket 8, a boom cylinder 10, an arm cylinder 11 and a bucket cylinder 12. A base end portion of the boom 6 is swingably attached to a front portion of the vehicle main body 1 by means of a boom pin 13. A base end portion of the arm 7 is swingably attached to a front end portion of the boom 6 by means of an arm pin 14.

To the front end portion of the arm 7, the bucket 8 is swingably attached by means of a bucket pin 15.

As illustrated in FIG. 2, the length of the boom 6, that is, the length from the boom pin 13 to the arm pin 14, is L1. The length of the arm 7, that is, the length from the center of the arm pin 14 to the center of the bucket pin 15, is L2. The length of the bucket 8, that is, the length from the center of the bucket pin 15 to blade edges P3 of the bucket 8, is L3. The blade edges P3 are front ends of blades 8B attached on the opposite side to the bucket pin 15 of the bucket 8.

The boom cylinder 10, the arm cylinder 11 and the bucket cylinder 12 illustrated in FIG. 1 are hydraulic cylinders which are driven by pressure of operating oil (adequately referred to as a "hydraulic pressure" below). The boom cylinder 10 drives the boom 6 to move up and down. The arm cylinder 11 drives the arm 7 to turn about the arm pin 14. The bucket cylinder 12 drives the bucket 8 to turn about the bucket pin 15. A proportional control valve 37 illustrated in FIG. 4 is arranged between the hydraulic cylinders such as the boom cylinder 10, the arm cylinder 11 and the bucket cylinder 12, and hydraulic pumps which are not illustrated. A work equipment electronic control device 26 which will be described below controls the proportional control valve 37 to control the flow rate of the operating oil to be supplied to the boom cylinder 10, the arm cylinder 11 and the bucket cylinder 12. As a result, operations of the boom cylinder 10, the arm cylinder 11 and the bucket cylinder 12 are controlled.

As illustrated in FIG. 2, the boom 6, the arm 7 and the bucket 8 are provided with a first stroke sensor 16, a second stroke sensor 17 and a third stroke sensor 18, respectively. The first stroke sensor 16, the second stroke sensor 17 and the third stroke sensor 18 are posture detection units which detect the posture of the work equipment 2. The first stroke sensor 16 detects a stroke length of the boom cylinder 10. A display control device 39 (see FIG. 4) which will be described below calculates a tilt angle θ1 of the boom 6 with respect to a Za axis of a vehicle main body coordinate system which will be described below, from the stroke length of the boom cylinder 10 detected by the first stroke sensor 16. The second stroke sensor 17 detects a stroke length of the arm cylinder 11. The display control device 39 calculates a tilt angle θ2 of the arm 7 with respect to the boom 6 from the stroke length of the arm cylinder 11 detected by the second stroke sensor 17. The third stroke sensor 18 detects the stroke length of the bucket cylinder 12. The display control device 39 calculates a tilt angle θ3 of the bucket 8 with respect to the arm 7 from the stroke length of the bucket cylinder 12 detected by the third stroke sensor 18.

The vehicle main body 1 has a position detection unit 19. The position detection unit 19 detects a current position of the excavator 100. The position detection unit 19 has two RTK-GNSS (Real Time Kinematic-Global Navigation Satellite Systems) antennas 21 and 22 (adequately referred to as "GNSS antennas 21 and 22" below), a three-dimensional position sensor 23 and a tilt angle sensor 24. The GNSS antennas 21 and 22 are installed in the vehicle main body 1, more specifically, the upper swing body 3. In the present embodiment, the GNSS antennas 21 and 22 are installed spaced a certain distance apart along a Ya axis of the vehicle main body coordinate system which will be described below. In addition, the position detection unit 19 and the above posture detection portions (these vehicle condition detection units) can detect a vehicle state such as the position and the posture of the excavating machine.

In addition, the GNSS antennas 21 and 22 are preferably installed on the upper swing body 3 and at both end positions of the excavator 100 spaced apart in left and right directions.

Further, the antennas may be installed on the upper swing body 3 and behind a counter weight (a rear end of the upper swing body 3) which is not illustrated or the cab 4. In either way, when the GNSS antennas 21 and 22 are installed at positions which are spaced apart as much as possible, precision to detect the current position of the excavator 100 improves. Further, the GNSS antennas 21 and 22 are preferably installed at positions so as not to block an operator's view as much as possible. Further, the position detection unit 19 and the posture detection units (these vehicle condition detection units) can detect a vehicle state such as the current position and the posture of the excavating machine (the excavator 100 in the present embodiment).

Signals corresponding to GNSS radio waves received by the GNSS antennas 21 and 22 are inputted to the three-dimensional position sensor 23. The three-dimensional position sensor 23 detects positions of installation positions P1 and P2 of the GNSS antennas 21 and 22. As illustrated in FIG. 3, the tilt angle sensor 24 detects a tilt angle θ4 (adequately referred to as a "roll angle θ4" below) in a direction in which gravity applies, that is, in a width direction of the vehicle main body 1 with respect to a vertical direction Ng. In addition, in the present embodiment, the width direction means a width direction of the bucket 8, and matches with the width direction of the upper swing body 3, that is, the left and right directions. Meanwhile, when the work equipment 2 has a tilt bucket which will be described below, the width direction of the bucket and the width direction of the upper swing body 3 do not match in some cases.

The excavator 100 has the operating device 25, the work equipment electronic control device 26, a work equipment control device 27 and an display system of the excavating machine (adequately referred to as a "display system" below) 101. The operating device 25 has work equipment operation members 31, work equipment operation detection units 32, traveling operation members 33 and traveling operation detection units 34. The work equipment operation member 31 is a member which the operator uses to operate the work equipment 2, and is, for example, a joystick or an operation lever. Further, there are two pairs of the work equipment operation members 31 and the work equipment operation detection units 32 (only one pair is illustrated in FIG. 4). The work equipment operation members 31 are installed on the left and the right of an operator's seat which is not illustrated in the cab 4. For example, it is possible to operate the bucket 8 and the boom 6 by operating the work equipment operation member 31 installed on the right, and it is possible to operate the arm 7 and the upper swing body 3 by operating the work equipment operation member 31 installed on the left. The work equipment operation detection units 32 detects content of operations of the work equipment operation members 31, and send detection signals to the work equipment electronic control device 26.

The traveling operation member 33 is a member which the operator uses to operate traveling of the excavator 100, and is, for example, a joystick or an operation lever. Further, there are two pairs of the traveling operation members 33 and the traveling operation detection units 34 (only one pair is illustrated in FIG. 4). The traveling operation members 33 are installed side by side on the left and the right ahead of the operator's seat which is not illustrated in the cab 4. It is possible to operate the right crawler track 5a by operating the traveling operation member 33 installed on the right side, and it is possible to operate the left crawler track 5b by operating the traveling operation member 33 installed on the left side.

The traveling operation detection units 34 detect content of operations of the traveling operation members 33, and send detection signals to the work equipment electronic control device 26.

The work equipment electronic control device 26 has a work equipment memory unit 35 which includes at least one of a RAM (Random Access Memory) and a ROM (Read Only Memory), and an operation unit 36 such as a CPU (Central Processing Unit). The work equipment electronic control device 26 mainly controls the work equipment 2. The work equipment electronic control device 26 generates a control signal for operating the work equipment 2 according to an operation of the work equipment operation member 31, and outputs the control signal to the work equipment control device 27. The work equipment control device 27 has the proportional control valve 37, and controls the proportional control valve 37 based on the control signal from the work equipment electronic control device 26. An operating oil flows out from the proportional control valve 37 at the flow rate matching the control signal from the work equipment electronic control device 26, and is supplied to at least one of the boom cylinder 10, the arm cylinder 11 and the bucket cylinder 12. Then, the boom cylinder 10, the arm cylinder 11 and the bucket cylinder 12 illustrated in FIG. 1 are driven according to the operating oil supplied from the proportional control valve 37. As a result, the work equipment 2 operates.

<Display System 28>

A display system 28 is a system which provides, to the operator, information for excavating a ground in a working area and forming the ground into a shape similar to a design surface which will be described below. The display system 28 includes the above boom cylinder 10, the arm cylinder 11, the bucket cylinder 12, the three-dimensional position sensor 23, the tilt angle sensor 24, the first stroke sensor 16, the second stroke sensor 17 and the third stroke sensor 18, and, in addition, the display input device 38 as a display device, the display control device 39 and a sound generating device 46 which includes a speaker for broadcasting a warning sound.

The display input device 38 has a touch panel input unit 41 and a display unit 42 such as an LCD (Liquid Crystal Display). The display input device 38 displays a guidance screen which provides information for excavation. Further, the guidance screen displays various keys. The operator who is an operating personnel (a service personnel in case of maintenance or repair of the excavator 100) can execute various functions of the display system 28 by touching various keys on the guidance screen. The guidance screen will be described in details below.

The display control device 39 executes various functions of the display system 28. The display control device 39 is an electronic control device which has a memory unit 43 which includes at least one of a RAM and a ROM, and a processing unit 44 such as a CPU. The memory unit 43 stores work equipment data. The work equipment data includes the above length L1 of the boom 6, length L2 of the arm 7 and length L3 of the bucket 8. Further, the working data includes minimum values and maximum values of the tilt angle θ1 of the boom 6, the tilt angle θ2 of the arm 7 and the tilt angle θ3 of the bucket 8.

The display control device 39 and the work equipment electronic control device 26 can communicate to and from each other through a wireless or wired communication unit. The memory unit 43 of the display control device 39 stores design geography data created in advance. The design geography data is information related to the shape and the position of a three-dimensional design geography. The design geography refers to a target shape of a ground which is an object to be worked. The display control device 39 displays the guidance screen on the display input device 38 based on the design geography data and information such as detection results from various sensors. More specifically, as illustrated in FIG. 5, the design geography is configured with a plurality of design surfaces 45 which is each represented by a triangular polygon. In addition, in FIG. 5, only one reference numeral 45 of a plurality of design surfaces is illustrated, and reference numerals of the other design surfaces are not illustrated. The target object to be worked is one or a plurality of design surfaces of these design surfaces 45. The operator selects one or a plurality of design surfaces of these design surfaces 45 as the target surface 70. The target surface 70 is a surface to be excavated from now among a plurality of design surfaces 45. The display control device 39 has the display input device 38 display the guidance screen which notifies the position of the target surface 70 to the operator.

<Guidance Screen>

Figure 6:
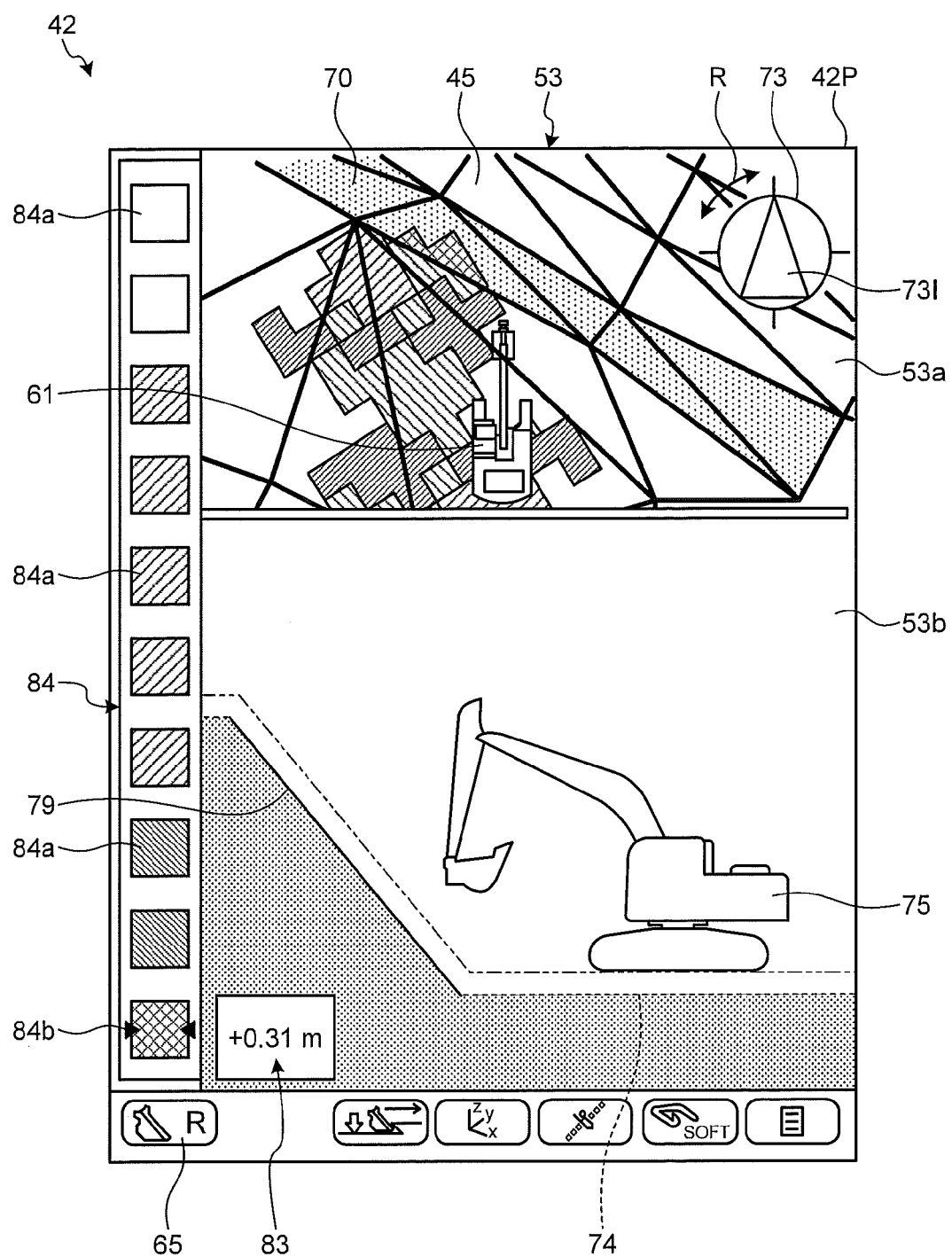
FIG. 6 is a view illustrating an example of a guidance screen.
Figure 7:
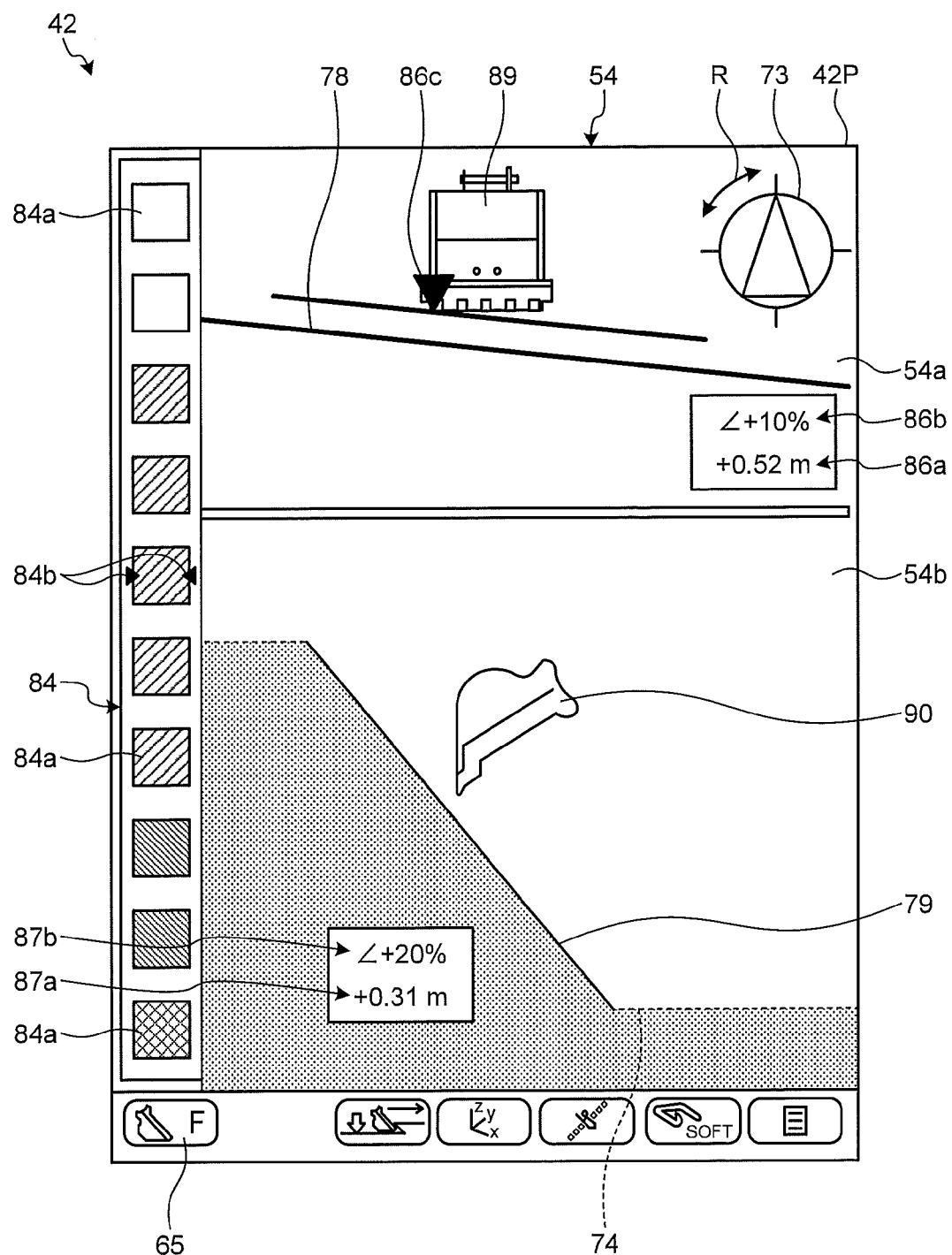
FIG. 7 is a view illustrating an example of the guidance screen.

FIGS. 6 and 7 are views illustrating examples of the guidance screen. The guidance screen is a screen which shows a positional relationship between the target surface 70 and the blade edges P3 of the bucket 8, and which guides the work equipment 2 of the excavator 100 to form a ground which is an object to be worked into the same shape as the target surface 70. As illustrated in FIGS. 6 and 7, the guidance screen includes a rough excavation mode guidance screen (adequately referred to as a "rough excavation screen 53" below) and a fine excavation mode guidance screen (adequately referred to as a "fine excavation screen 54" below).

(Rough Excavation Screen 53)

The rough excavation screen 53 illustrated in FIG. 6 is displayed on a screen 42P of the display unit 42. The rough excavation screen 53 includes a top view 53a which illustrates a design geography of a working area (a design surface 45 including the target surface 70) and a current position of the excavator 100, and a side view 53b which illustrates a positional relationship between the target surface 70 and the excavator 100. The top view 53a of the rough excavation screen 53 represents a design geography by a plurality of triangular polygons seen from the top view. More specifically, the top view 53a represents a design geography which illustrates as a projection surface a rotation surface which is a surface on which the excavator 100 rotates. Hence, the top view 53a is a bird view illustrating the excavator 100 from above, and when the excavator 100 tilts, the design surface 45 also tilts.

Further, the target surface 70 which is selected as a target object to be worked from a plurality of design surfaces 45 is displayed by a color different from those of the other design surfaces 45. In addition, although, in FIG. 6, the current position of the excavator 100 is indicated by an icon 61 of the excavator 100 seen from the top view, the current position may be indicated by other symbols. Further, the top view 53a includes information which makes the excavator 100 face with the target surface 70. The information which makes the excavator 100 face with the target surface 70 is displayed as a target surface facing compass 73. The target surface facing compass 73 is, for example, an icon an arrow-shaped pointer 731 which rotates in an arrow R direction, and which indicates a direction facing with the target surface 70 and a direction in which the excavator 100 needs to be rotated. The operator of the excavator 100 can check the degree of facing with respect to the target surface 70 from the target surface facing compass 73.

The side view 53b of the rough excavation screen 53 includes an image which shows a positional relationship between the target surface 70 and the blade edges P3 of the bucket 8, and distance information which indicates a distance between the target surface 70 and the blade edges P3 of the bucket 8. More specifically, the side view 53*b* includes a design surface line 74, a target surface line 79 and an icon 75 of the excavator 100 seen from the side view. The design surface line 74 indicates a cross section of the design surface 45 other than the target surface 70. The target surface line 79 indicates the cross section of the target surface 70. As illustrated in FIG. 5, the design surface line 74 and the target surface line 79 are derived by calculating an intersecting line 80 of a surface 77 which passes on the current positions of the blade edges P3 of the bucket 8 and the design surface 45. The intersecting line 80 is calculated by the processing unit 44 of the display control device 39. A method of calculating current positions of the blade edges P3 of the bucket 8 will be described below.

In the side view 53*b*, the target surface line 79 is displayed by a color different from that of the design surface line 74. In addition, the target surface line 79 and the design surface line 74 are represented by changing line types in FIG. 6. Further, in the side view 53*b*, an area closer to an underground side than the target surface line 79 and the design surface line 74, and an area closer to an aerial side than these lines are indicated by different colors. In FIG. 6, the difference in color is represented by applying a hatching to the area closer to the underground side than the target surface line 79 and the design surface line 74.

The distance information which indicates the distance between the target surface 70 and the blade edges P3 of the bucket 8 includes numerical value information 83 and graphic information 84. The numerical value information 83 is a numerical value indicating the shortest distance between the blade edges P3 of the bucket 8 and the target surface 70. The graphic information 84 is information which indicates a distance between the blade edges P3 of the bucket 8 and the target surface 70 as graphics. The graphic information 84 is a guidance indicator which indicates the positions of the blade edges P3 of the bucket 8. More specifically, the graphic information 84 includes index bars 84*a*, and index marks 84*b* of the index bars 84*a* which indicate a position at which the distance between the blade edges P3 of the bucket 8 and the target surface 70 corresponds to zero. Each index bar 84*a* is lighted according to the shortest distance between the front end of the bucket 8 and the target surface 70. In addition, on/off of display of the graphic information 84 may be changed by an operation of the input unit 41 by the operator of the excavator 100.

As described above, the rough excavation screen 53 displays a relative positional relationship between the target surface line 79 and the excavator 100, and a numerical value which indicates the shortest distance between the blade edges P3 of the bucket 8 and the target surface line 79. The operator of the excavator 100 can easily excavate a ground such that the current geography is formed into a design geography by moving the blade edges P3 of the bucket 8 along the target surface line 79. In addition, the rough excavation screen 53 displays a screen switch key 65 which switches the guidance screen. The operator can switch the rough excavation screen 53 to the fine excavation screen 54 by operating the screen switch key 65.

(Fine Excavation Screen 54)

The fine excavation screen 54 illustrated in FIG. 7 is displayed on the screen 42P of the display unit 42. The fine excavation screen 54 illustrates the positional relationship between the target surface 70 and the excavator 100 in more detail than the rough excavation screen 53. That is, the fine excavation screen 54 displays the positional relationship between the target surface 70 and the blade edges P3 of the bucket 8 in more detail than the rough excavation screen 53.

The fine excavation screen 54 includes a front view 54*a* which shows the target surface 70 and the bucket 8, and a side view 54*b* which shows the target surface 70 and the bucket 8. The front view 54*a* of the fine excavation screen 54 includes an icon 89 which indicates the bucket 8 seen from the front, and a line 78 (adequately referred to as a "target surface line 78" below) which indicates a cross section of the target surface 70 seen from the front. "Seen from the front" is a view seen from a direction orthogonal to a direction in which the bucket pin 15 illustrated in FIGS. 1 and 2 extends.

The target surface line 78 is found as follows. An intersecting line obtained when a vertical line is drawn from the blade edges P3 of the bucket 8 in a vertical direction (gravity direction) and the surface including this vertical line crosses the target surface 70 is the target surface line 78. That is, this intersecting line is the target surface line 78 in a global coordinate system. Meanwhile, under conditions that an intersecting line has a positional relationship parallel to a line in up and down directions of the vehicle main body 1, the intersecting line obtained when a line is drawn from the blade edges P3 of the bucket 8 toward the target surface 70 and the surface including this line crosses the target surface 70 may be the target surface line 78. That is, the intersecting line is the target surface line 78 in the vehicle main body coordinate system. The operator can select in which one of coordinate systems the target surface line 78 is displayed, by operating the switch key of the input unit 41 which is not illustrated.

The side view 54*b* of the fine excavation screen 54 includes an icon 90 of the bucket 8 seen from a side, a design surface line 74 and the target surface line 79. Further, the front views 54*a* and the side view 54*b* of the fine excavation screen 54 each display information indicating the positional relationship between the target surface 70 and the bucket 8. "Seen from a side" is a view seen from a direction in which the bucket pin 15 illustrated in FIGS. 1 and 2 extends (a turn center axis direction of the bucket 8).

The information indicating the positional relationship between the target surface 70 and the bucket 8 in the front view 54*a* includes distance information 86*a* and angle information 86*b*. The distance information 86*a* indicates a distance between the blade edges P3 of the bucket 8 and the target surface 70 in the Za direction in the vehicle main body coordinate system. Meanwhile, the distance information 86*a* illustrated in the front view 54*a* may be a distance in a global coordinate system Z. This distance is a distance between the target surface line 78, and a closest position of the positions of the blade edges P3 of the bucket 8 in the width direction with respect to the target surface 70. In addition, the distance information 86*a* can be set to non-display. In the front view 54*a*, a mark 86*c* which indicates the closest position is overlaid on the icon 89 in the front view of the bucket 8 and displayed. The angle information 86*b* is information indicating an angle between the target surface 70 and the bucket 8. More specifically, the angle information 86*b* is an angle between a virtual line which passes on the blade edges P3 of the bucket 8 and the target surface line 78.

In the side view 54*b*, information indicating the positional relationship between the target surface 70 and the bucket 8 includes distance information 87*a* and angle information 87*b*. The distance information 87*a* indicates the shortest distance between the blade edges P3 of the bucket 8 and the target surface 70, that is, the distance between the front end of the bucket 8 in a direction vertical to the surface of the target surface 70 and the target surface 70. Alternatively, in the side view 54*b*, the distance between the blade edges of the bucket 8 and a point at which the line drawn from the blade edges in the vertical direction and the target surface 70 crosses may be the distance information 87a. Further, the angle information 87b is information which indicates an angle between the target surface 70 and the bucket 8. More specifically, the angle information 87b displayed in the side view 54b is an angle between a bottom surface of the bucket 8 and the target surface line 79.

The fine excavation screen 54 includes the graphic information 84 which indicates the above distance between the blade edges P3 of the bucket 8 and the target surface 70 as graphics. The graphic information 84 includes the index bars 84a and the index marks 84b similar to the graphic information 84 of the rough excavation screen 53. As described above, the fine excavation screen 54 displays a relative positional relationship between the target surface lines 78 and 79 and the blade edges P3 of the bucket 8 in detail. The operator of the excavator 100 can more easily excavate a ground such that the current geography is formed into a design geography by moving the blade edges P3 of the bucket 8 along the target surface lines 78 and 79. In addition, the fine excavation screen 54 displays the screen switch key 65 similar to the above rough excavation screen 53. The operator can switch the fine excavation screen 54 to the rough excavation screen 53 by operating the screen switch key 65.

<Method of Calculating Current Positions of Blade Edges P3 of Bucket 8>

The target surface line 79 is calculated from current positions of the blade edges P3 of the bucket 8. The display control device 39 calculates the current positions of the blade edges P3 of the bucket 8 in the global coordinate system {X,Y,Z} based on detection results of, for example, the three-dimensional position sensor 23, the first stroke sensor 16, the second stroke sensor 17, the third stroke sensor 18 and the tilt angle sensor 24. In the present embodiment, the current positions of the blade edges P3 of the bucket 8 are calculated as follows.

Figure 8:
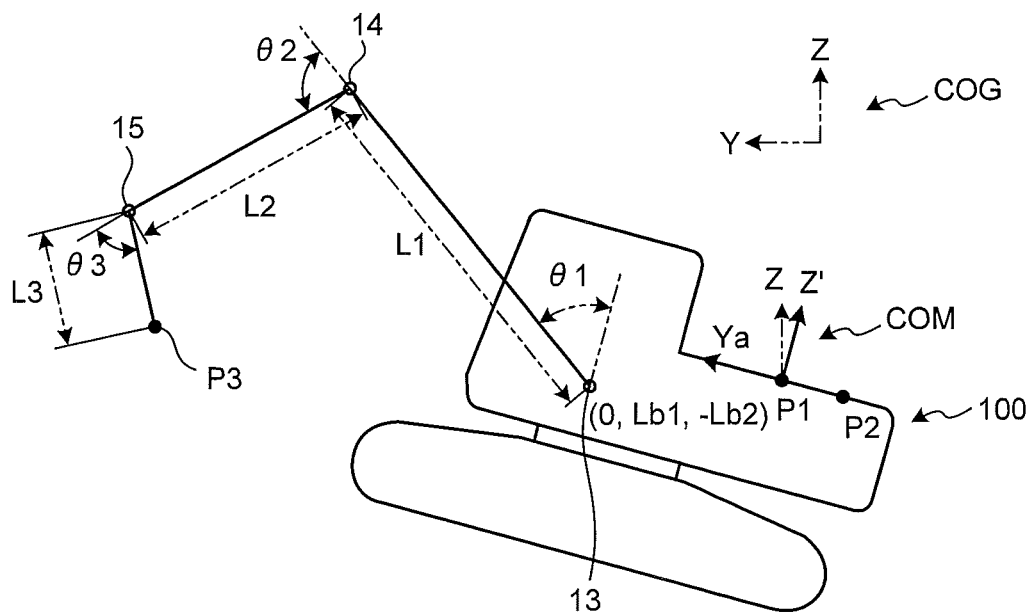
FIG. 8 is a view for describing an example of a method of calculating current positions of blade edges P3 of a bucket 8.
Figure 9:
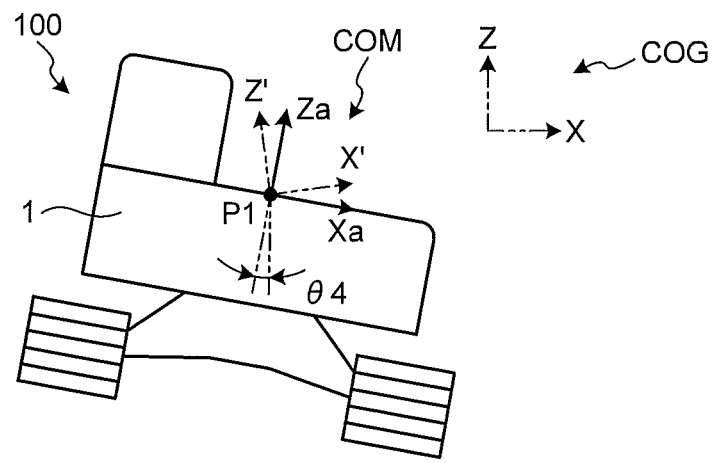
FIG. 9 is a view for describing an example of the method of calculating current positions of the blade edges P3 of the bucket 8.

FIGS. 8 and 9 are views for describing examples of the method of calculating current positions of the blade edges P3 of the bucket 8. FIG. 8 is a side view of the excavator 100, and FIG. 9 is a rear view of the excavator 100. To calculate the current positions of the blade edges P3 of the bucket 8, the display control device 39 calculates a vehicle main body coordinate system {Xa,Ya,Za} the origin of which is the installation position P1 of the above GNSS antenna 21 as illustrated in FIGS. 8 and 9. In this example, front and rear directions of the excavator 100, that is, a Ya axis direction of a coordinate system (vehicle main body coordinate system) COM of the vehicle main body 1, is tilted with respect to the Y axis direction of a global coordinate system COG. Further, the coordinate of the boom pin 13 in the vehicle main body coordinate system COM is (0, Lb1, −Lb2), and is stored in the memory unit 43 of the display control device 39 in advance.

The three-dimensional position sensor 23 illustrated in FIGS. 2 and 4 detects the installation positions P1 and P2 of the GNSS antennas 21 and 22. A unit vector in the Ya axis direction is calculated according to Equation (1) from the coordinate positions of the detected installation positions P1 and P2.

$$Ya=(P1-P2)/|P1-P2| \quad (1)$$

As illustrated in FIG. 8, when a vector Z' which passes on the surface represented by two vectors Ya and Z and is vertical to Ya is introduced, relationships of Equation (2) and Equation (3) hold. c in Equation (3) is a constant. Z' is expressed as in Equation (4) according to Equation (2) and Equation (3).

Further, when a vector which is vertical to Ya and Z' is X', X' is expressed as in Equation (5).

$$(Z', Ya)=0 \quad (2)$$

$$Z'=(1-c) \times Z+c \times Ya \quad (3)$$

$$Z'=Z+\{(Z,Ya)/((Z,Ya)-1)\} \times (Ya-Z) \quad (4)$$

$$X'==Ya \perp Z' \quad (5)$$

As illustrated in FIG. 9, the vehicle main body coordinate system COM is rotated only the roll angle θ4 about the Ya axis, and then is expressed as in Equation (6).

$$[Xa \ Ya \ Za]=[X' \ Ya \ Z'] \begin{bmatrix} \cos\theta 4 & 0 & \sin\theta 4 \\ 0 & 1 & 0 \\ -\sin\theta 4 & 0 & \cos\theta 4 \end{bmatrix} \quad (6)$$

Further, the current tilt angles θ1, θ2 and θ3 of the above boom 6, the arm 7 and bucket 8 are calculated from detection results of the first stroke sensor 16, the second stroke sensor 17 and the third stroke sensor 18. The coordinate (xat, yat, zat) of the blade edges P3 of the bucket 8 in the vehicle main body coordinate system COM can be calculated according to Equation (7), Equation (8) and Equation (9) using the tilt angles θ1, θ2 and θ3 and the lengths L1, L2 and L3 of the boom 6, the arm 7 and the bucket 8. The blade edges P3 of the bucket 8 move in a Ya-Za surface of the vehicle main body coordinate system COM. The coordinate of the blade edge P3 of the bucket 8 in the global coordinate system COG can be calculated according to Equation (10). The coordinates of the blade edges P3 in the global coordinate system COG are positions of the blade edges P3.

$$xat=0 \quad (7)$$

$$yat=Lb1+L1 \times \sin\theta 1+L2 \times \sin(\theta 1+\theta 2)+L3 \times \sin(\theta 1+2+3) \quad (8)$$

$$za=-Lb2+L1 \times \cos\theta 1+L2 \times \cos(\theta 1+\theta 2)+L3 \times \cos(\theta 1+\theta 2+\theta 3) \quad (9)$$

$$P3=xat \cdot Xa+yat \cdot Ya+zat \cdot Za+P1 \quad (10)$$

The display control device 39 calculates the current positions of the blade edges P3 of the bucket 8 calculated as described above, and the intersecting line 80 of a three-dimensional geography and a surface (adequately referred to as "a Ya-Za surface 77" below) which passes on the blade edges P3 of the bucket 8 as illustrated in FIG. 5 based on the design geography data stored in the memory unit 43. Further, the display control device 39 displays a portion of this intersecting line 80 which passes on the target surface 70, on the guidance screen as the above target surface line 79. Next, an example will be described where the display control device 39 illustrated in FIG. 4 displays a trajectory of the blade edges P3 which the bucket 8 take to excavate a ground of an object to be worked, on the screen 42P of the display unit 42 of the display input device 38.

<Trajectory Display of Blade Edges P3 of Bucket 8>

Figure 10:
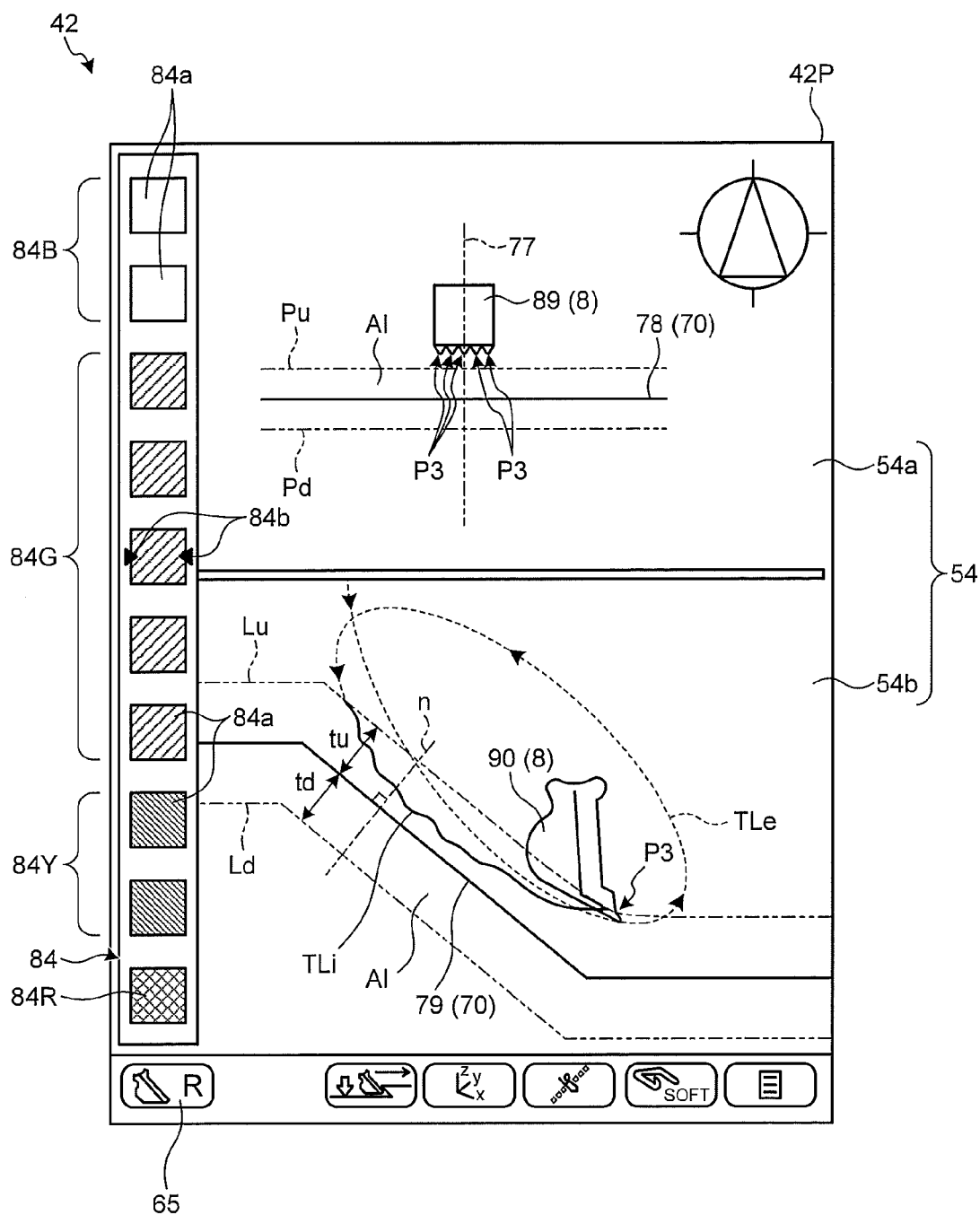
FIG. 10 is a view illustrating an example where a trajectory TLi of the blade edges P3 of the bucket 8 is displayed on a screen 42P of a display unit 42.

FIG. 10 is a view illustrating an example where the trajectory TLi of the blade edges P3 of the bucket 8 is displayed on the screen 42P of the display unit 42. In the present embodiment, the display control device 39, more specifically, the processing unit 44 calculates positions of the blade edges P3 of the bucket 8 based on information related to a current position of the excavator 100. Further, the processing unit 44 displays the trajectory (adequately referred to as a "blade edge trajectory" below) TLi of the blade edges P3 which is calculated based on the positions of the blade edges P3 and which exists in a predetermined range AI when at least part of the bucket 8 enters the predetermined range AI which is a periphery of the target surface 70 in a direction orthogonal to the target surface 70, as information related to a construction work result on the screen 42P of the display unit 42. By so doing, the operator of the excavator 100 can check on the screen 42P of the display unit 42 a state actually excavated by the bucket 8 according to the blade edge trajectory TLi. As a result, the operator can continue construction work while checking a current construction work situation by viewing the blade edge trajectory TLi, so that working efficiency improves. Further, when the blade edges P3 are outside the predetermined range AI, the blade edge trajectory is not displayed. That is, extra information other than information about the vicinity of the design surface (or the target surface) is not displayed on the screen 42P, so that the display system 28 can intelligibly provide information related to a construction work result to the operator when the operator of the excavator 100 proceeds with construction work according to the design surface.

Although an example will be described with the present embodiment where the blade edge trajectory TLi is displayed on the above fine excavation screen 54, the blade edge trajectory TLi may be displayed on the rough excavation screen 53. As illustrated in FIG. 10, the blade edge trajectory TLi is displayed in the side view 54b of the fine excavation screen 54. That is, the blade edge trajectory TLi is a trajectory of the blade edges P3 of the bucket 8 seen from a side.

The side view 54b displays the icon 90 of the bucket 8 seen from a side. Further, the side view 54b displays a target surface line 79 which indicates the cross section of the target surface 70 seen from a side and a ground surface drawn line Lu and an underground drawn line Ld which define the predetermined range AI in a direction orthogonal to the target surface 70 (chain double-dashed lines in FIG. 10). The ground surface drawn line Lu and the underground drawn line Ld are parallel to the target surface line 79. The front view 54a displays the icon 89 of the bucket 8 seen from the front view, the target drawn line 78 which indicates the cross section of the target surface 70 seen from the front view, and a first surface Pu and a second surface Pd which will be described below.

The predetermined range AI is a range surrounded by the first surface Pu which is parallel to the target surface 70 positioned at a predetermined distance tu to the ground surface from the target surface 70 in a direction orthogonal to the target surface 70 (in a direction in which a chain line n in FIG. 10 extends), and the second surface Pd which is parallel to the target surface 70 which is positioned a predetermined distance td toward the underground. An intersecting line of the first surface Pu and the Ya-Za surface 77 (see FIG. 5) on which the blade edges P3 of the bucket 8 pass is the ground surface drawn line Lu, and the intersecting line 80 of the second surface Pd and the Ya-Za surface 77 is the underground drawn line Ld.

In FIG. 10, the blade edge trajectory TLi is a solid line drawn in the predetermined range AI. In FIG. 10, a broken line drawn outside the predetermined range AI (an outer side of the ground surface drawn line Lu in this example) is also a trajectory (adequately referred to as an "out-of-range trajectory" below) TLe of the blade edges P3 of the bucket 8. In this example, the out-of-range trajectory TLe is disclosed for ease of description, and is not displayed on the actual screen 42P of the display unit 42.

The predetermined distances tu and td which define the predetermined range AI may have the same length or difference lengths. When the predetermined distances tu and td have different lengths, the predetermined distance td is preferably shorter than the predetermined distance tu to obtain precision of construction work. In the present embodiment, the predetermined distances tu and td have the same length, that is, tu=td is true. In the present embodiment, the size of the predetermined range AI, that is, the lengths of the predetermined ranges tu and td, correspond to the tolerance upon construction work of the target surface 70 by the excavator 100. By so doing, it is possible to reduce a likelihood that the design surface 45 (target surface 70) is excessively excavated, and prevent a decrease in precision of construction work. Further, the lengths of the predetermined distances tu and td may be changeable. For example, the processing unit 44 of the display control device 39 may have the display unit 42 of the display input device 38 illustrated in FIG. 4 display a menu to change the predetermined distances tu and td, and the operator of the excavator 100 may input a change value through the input unit 41. By so doing, even when it is necessary to change the predetermined range AI depending on a design change or an actual situation of a construction work site, it is possible to flexibly handle this change and, consequently, improve working efficiency.

In the present embodiment, the predetermined range AI corresponds to a range indicated by a reference numeral 84G among a plurality of index bars 84a of the graphic information 84. That is, a size corresponding to tu+td which is the size of the predetermined range AI in the direction orthogonal to the target surface 70 corresponds to the range of the plurality of index bars 84a indicated by the reference numeral 84G. In the present embodiment, as long as the blade edges P3 of the bucket 8 move in this range, construction work is conducted within a range of tolerance upon design of the target surface 70.

A range indicated by a reference numeral 84B of a plurality of index bars 84a of the graphic information 84 indicates an outside of the predetermined range AI on the ground surface side. A range indicated by a reference numeral 84Y of a plurality of index bars 84a of the graphic information 84 indicates an outside of the predetermined range AI on the underground side. This range indicates that excavation of the target surface 70 goes beyond the range of tolerance upon design of the target surface 70. A range indicated by a reference numeral 84R of a plurality of index bars 84a of the graphic information 84 indicates an outside of the predetermined range AI on the deepest underground side. This range indicates that excavation of the target surface 70 goes far beyond the range of tolerance upon design of the target surface 70.

A plurality of index bars 84a of the graphic information 84 displays positional relationships between the blade edges P3 of the bucket 8 and the target surface 70 upon excavation by the excavator 100. That is, a display mode of the index bar 84a changes according to a distance between the blade edges P3 and the target surface 70. For example, the index bar 84a in the range of the reference numeral 84B is displayed in blue, the index bar 84a in the range of the reference numeral 84G is displayed in green, the index bar 84a in the range of the reference numeral 84Y is displayed in yellow and the index bar 84a in the range of the reference numeral 84R is displayed in red.

Consequently, when the blade edges P3 of the bucket 8 are outside of the predetermined range AI on the ground surface side, the index bar 84a in the range indicated by the reference numeral 84B is displayed in blue. Further, when the blade edges P3 of the bucket 8 are in the predetermined range AI, the index bar 84a in the range indicated by the reference numeral 84B is displayed in blue, and the index bar 84a in the range indicated by the reference numeral 84G is displayed in green. When the blade edges P3 of the bucket 8 are outside the predetermined range AI on the underground side, the index bar 84a in the range indicated by the reference numeral 84B is displayed in blue, the index bar 84a in the range indicated by the reference numeral 84G is displayed in green and the index bar 84a in the range indicated by the reference numeral 84Y is displayed in yellow. Thus, in addition to display of the blade edge trajectory TLi, a display mode of the index bar 84a is changed according to the distance between the blade edges P3 of the bucket 8 and the target surface 70, so that the operator of the excavator 100 can more easily learn whether or not excavation using the blade edges P3 of the bucket 8 goes beyond the predetermined range AI around the target surface 70. As a result, the operator can easily hold the blade edges P3 of the bucket 8 in the predetermined range AI during excavation, so that precision of construction work improves.

The blade edge trajectory TLi is displayed in the predetermined range AI when the blade edges P3 of the bucket 8 enter the predetermined range AI. By so doing, the display control device 39 can display on the screen 42P of the display unit 42 the blade edge trajectory TLi when the blade edges P3 of the bucket 8 excavate the actual predetermined range AI, so that the operator of the excavator 100 can check a construction work situation in a sufficiently necessary range. In addition, the blade edge trajectory TLi is not limited to this, and may be displayed in the predetermined range AI when part of the bucket 8, that is, the back surface enters the predetermined range AI. Thus, in the present embodiment, the blade edge trajectory TLi needs to be displayed only when at least part of the bucket 8 enters the predetermined range AI.

The blade edge trajectory TLi is not displayed outside the predetermined range AI, and, when the target surface 70 is excavated once, that is, when, for example, the normal surface is a ground of an object to be worked (target surface 70), excavation of upward and downward digging and drilling to a predetermined depth using the bucket 8 is finished, and, after the blade edges P3 of the bucket 8 go out of the predetermined range AI, the out-of-range TLe outside the predetermined range AI is not displayed. After the blade edges P3 of the bucket 8 go out of the predetermined range AI, the blade edge trajectory TLi displayed in the predetermined range AI is kept being displayed until the blade edges P3 enter the predetermined range AI next. By so doing, the operator of the excavator 100 can check an excavation history of a ground of an object to be worked by the blade edges P3 of the bucket 8, on the screen 42P of the display unit 42. Further, the display control device 39 does not display the out-of-range trajectory TLe outside the predetermined range AI, so that it is possible to have the operator reliably recognize information about the vicinity of the target surface 70 which is necessary for an operation. Furthermore, the display control device 39 does not display the out-of-range trajectory TLe outside the predetermined range AI, and does not need to store data of the out-of-range trajectory TLe in the memory unit 43. Consequently, it is possible to efficiently and effectively utilize memory capacity of the memory unit 43.

Although the out-of-range trajectory TLe is not displayed with the above example, the present embodiment is not limited to this. For example, the display control device 39 may vary display modes of the blade edge trajectory TLi and the out-of-range trajectory TLe to display on the screen 42P of the display unit 42. As an example, the display control device 39 may display the blade edge trajectory TLi by a red solid line, and displays the out-of-range trajectory TLe by a less distinct color than that of the blade edge trajectory TLi (for example, light blue in this example) and a broken line thinner than the solid line indicating the blade edge trajectory TLi. By so doing, the display control device 39 can have the operator of the excavator 100 recognize the blade edge trajectory TLi in the predetermined range AI. Further, the operator can view the out-of-range trajectory TLe, so that, when, for example, the bucket 8 is moved to a ground of an object to be worked, it is possible to use the out-of-range trajectory TLe in order to improve the method of operating the work equipment operation members 31 and improve working efficiency.

Thus, even when display modes of the blade edge trajectory TLi and the out-of-range trajectory TLe are varied to display on the screen 42P of the display unit 42, the out-of-range trajectory TLe outside the predetermined range AI is less distinct than the blade edge trajectory TLi in the predetermined range AI. Consequently, even when the out-of-range trajectory TLe is displayed on the screen 42P, the operator of the excavator 100 is not prevented from recognizing the blade edge trajectory TLi. As a result, the display system 28 can intelligibly provide information related to a construction work result to the operator when the operator of the excavator 100 proceeds with construction work according to the design surface.

As described above, in the present embodiment, display modes of the blade edge trajectory TLi in the predetermined range AI and the out-of-range trajectory TLe outside the predetermined range AI only need to be varied. Varying display modes of both include displaying both and varying the display modes of both and, in addition to displaying only the blade edge trajectory TLi without displaying the out-of-range trajectory TLe.

In the present embodiment, the display control device 39 may broadcast a sound as a warning based on a distance between the blade edges P3 of the bucket 8, and the target surface 70 or the design surface 45 which is not set to the target surface 70. When, for example, the blade edges P3 go out of the predetermined range AI on a underground side of an object to be worked, that is, the blade edges P3 move closer to the underground side than the underground drawn line Ld, the display control device 39 may have the sound generating device 46 illustrated in FIG. 4 broadcast a warning sound. Further, when excavation of the blade edges P3 of the bucket 8 goes beyond the target surface 70 or the design surface 45, labor such as backfilling is required, and therefore construction work of the design surface 45 (target surface 70) does not efficiently proceed. Hence, the display control device 39 broadcasts a sound, too as a warning based on the distance between the blade edges P3 and the design surface 45. Thus, by changing a mode of broadcasting a sound as a warning based on the distance between the blade edges P3 and the target surface 70 or the design surface 45, it is possible to have the operator of the excavator 100 recognize that excavation goes far beyond the target surface 70 or the design surface 45. Consequently, the operator can minimize excessive excavation by adjusting the amount of excavation.

Further, when the blade edges P3 go further more toward the underground side, that is, when the blade edges P3 of the bucket 8 go farther toward the underground side from the target surface 70, the display control device 39 may increase a level of a warning sound by, for example, increasing a warning sound. That is, the display control device 39 may increase the level of the warning sound more when the distance between the target surface 70 and the blade edges P3 of the bucket 8 is longer. By so doing, it is possible to have the operator recognize the degree of excessive excavation of the target surface 70. Next, an example of display process of the blade edge trajectory TLi will be described.

<Display Process of Blade Edge Trajectory TLi>

Figure 11:
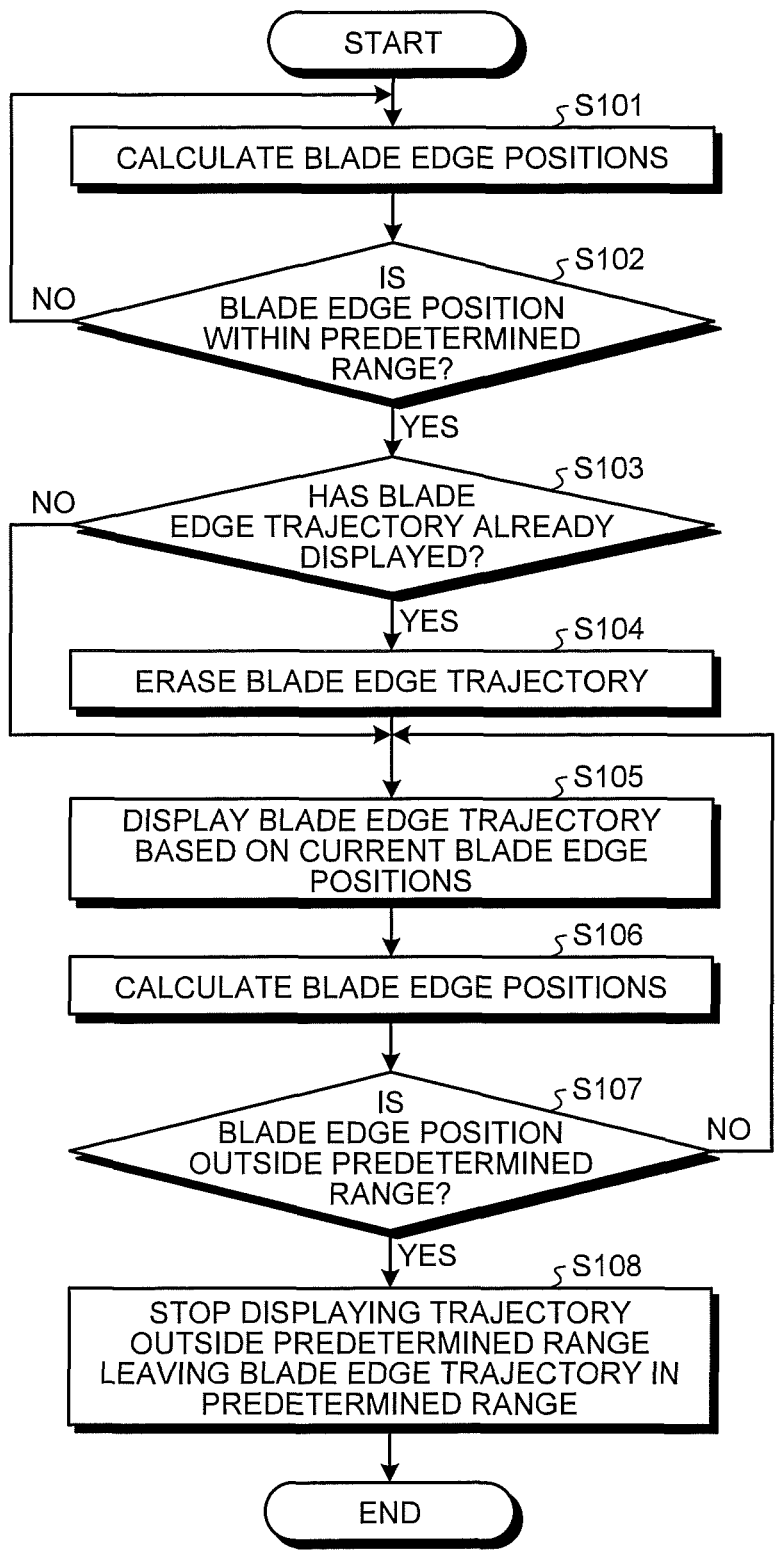
FIG. 11 is a flowchart illustrating an example of display process of displaying the blade edge trajectory TLi on the screen 42P of the display unit 42.

FIG. 11 is a flowchart illustrating an example of display process of displaying the blade edge trajectory TLi on the screen 42P of the display unit 42. FIGS. 12 to 15 are views illustrating states of the screen 42P of the display unit 42 which displays the blade edge trajectory TLi. To display the blade edge trajectory TLi on the screen 42P of the display unit 42 illustrated in FIG. 4, in step S101, the display control device 39, more specifically, the processing unit 44 calculates the positions of the blade edges P3 of the bucket 8 (adequately referred to as "blade edge positions" below). The method of calculating blade edge positions are as described above.

Figure 12:
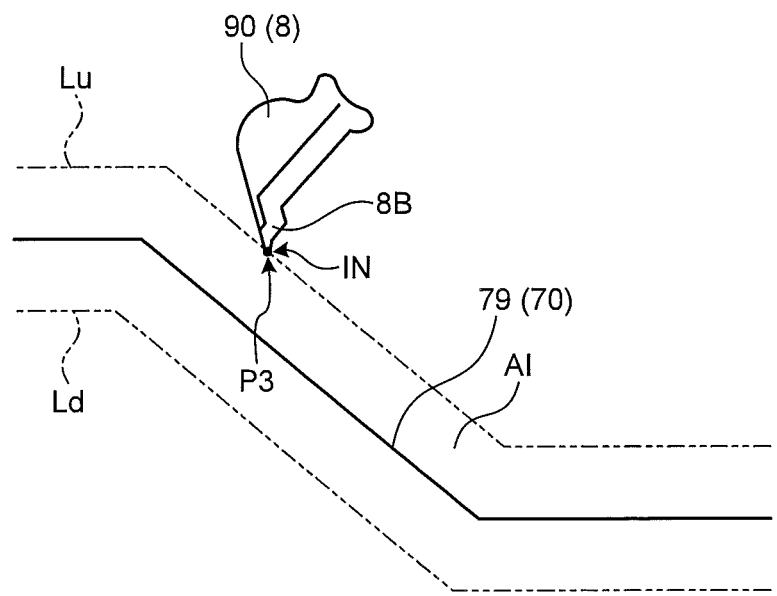
FIG. 12 is a view illustrating a state of the screen 42P of the display unit 42 which displays the blade edge trajectory TLi.

Next, the processing unit 44 compares the blade edge positions calculated in step S101 and the position of the predetermined range AI illustrated in FIG. 12 in step S102, and, when the blade edge positions are in the predetermined range AI (Yes in step S102), advances processing to step S103. When the blade edge positions are not in the predetermined range AI (No in step S102), the processing unit 44 repeats step S101 and step S102.

In step S102, the processing unit 44 compares, for example, the blade edge positions (the coordinates of the blade edges P3 in the global coordinate system COG), and the ground surface drawn line Lu and the underground drawn line Ld illustrated in FIG. 12 (the coordinates in the global coordinate system COG), and, when the blade edge positions are between the ground surface drawn line Lu and the underground drawn line Ld, the blade edge positions are regarded in the predetermined range AI. Further, when the blade edge positions are not between the ground surface drawn line Lu and the underground drawn line Ld, the processing unit 44 recognizes that the blade edge positions are outside the predetermined range AI. In the present embodiment, also when the blade edge positions are on the ground surface drawn line Lu or on the underground drawn line Ld, the blade edge positions are regarded in the predetermined range AI. Instead of the positions of the ground surface drawn line Lu and the underground drawn line Ld, positions of the first surface Pu and the second surface Pd illustrated in FIG. 10 (coordinates in the global coordinate system COG) may be used.

In step S103, when the blade edge trajectory TLi is already displayed on the screen 42P of the display unit 42 in the predetermined range AI on a traveling direction side of the bucket 8, more specifically, the blade edges P3 (Yes in step S103), the processing unit 44 advances processing to step S104. In step S104, the processing unit 44 erases the blade edge trajectory TLi, that is, erases display of the blade edge trajectory TLi on the screen 42P of the display unit 42, and advances processing to step S105. In step S103, when the blade edge trajectory TLi is not yet displayed in the predetermined range AI on the screen 42P of the display unit 42 (No in step S103), the processing unit 44 advances processing to step S105.

Figure 13:
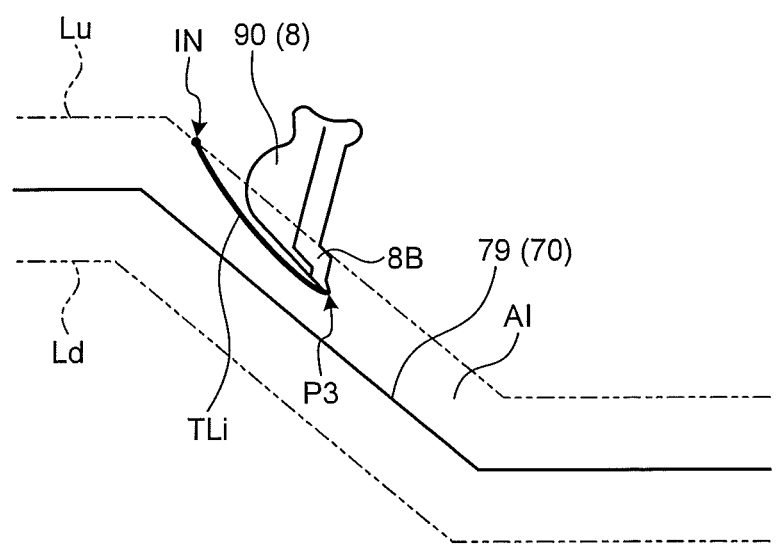
FIG. 13 is a view illustrating a state of the screen 42P of the display unit 42 which displays the blade edge trajectory TLi.

In step S105, the processing unit 44 displays the blade edge trajectory TLi based on the current blade edge positions, on the screen 42P of the display unit 42 as illustrated in FIG. 13. In this case, the blade edge trajectory TLi is displayed in the predetermined range AI, that is, between the ground surface drawn line Lu and the underground drawn line Ld. In FIG. 13, an intersection point IN of the blade edge trajectory TLi and the ground surface drawn line Lu indicates a position at which the blade edges P3 of the bucket 8 enter the predetermined range AI.

The processing unit 44 can display the blade edge trajectory TLi by, for example, displaying blade edge positions in the same coordinate system as that of the ground surface drawn line Lu and the underground drawn line Ld and connecting the blade edge positions already displayed in the predetermined range AI and the blade edge positions newly displayed by a line and displaying the blade edge positions. That is, the processing unit 44 displays the blade edge trajectory TLi by calculating blade edge positions at a predetermined cycle when the blade edges P3 move in the predetermined range AI, and connecting a plurality of calculated blade edge positions (points) by a line (for example, a straight line). In addition, when the blade edges P3 stop moving in the predetermined range AI (when, for example, the operator stops operating the work equipment operation members 31), the processing unit 44 preferably interrupts processing of calculating the blade edge positions at a predetermined cycle. Further, when the blade edges P3 stop moving as described above, blade edge positions (points) may not be displayed without interrupting processing of calculating the blade edge positions. That is, the processing unit 44 calculates the blade edge positions at sites at which the blade edges stop, and then does not calculate new blade edge positions as long as the blade edges continue stopping even after a predetermined cycle passes. This is because, when new blade edge positions are calculated and points are displayed, a plurality of points are overlaid and displayed at the substantially same positions, the blade edge trajectory TLi is hardly viewed. That is, when blade edge positions are displayed in the predetermined range AI for the first time, the blade edge positions correspond to the blade edge trajectory TLi. The blade edge trajectory TLi is a set of blade edge positions (obtained by connecting points by a straight line), and indicates a route on which the blade edges P3 of the bucket 8 move in the predetermined range AI. In addition, although the blade edge trajectory TLi is obtained by connecting a plurality of points by a straight line, and, when limitation is set to the number of points in advance, the blade edge trajectory TLi of the number of points corresponding to this limitation is calculated and then points indicating new blade edge positions are calculated, the processing unit 44 erases the points in order from the oldest point, and updates and displays the blade edge trajectory TLi.

Next, in step S106, the processing unit 44 calculates the blade edge positions. Next, in step S107, the processing unit 44 compares the blade edge positions calculated in step S106 and the positions in the predetermined range AI illustrated in FIG. 13. When the blade edge positions are outside the predetermined range AI (Yes in step S107), the processing unit 44 advances processing to step S108. When the blade edge positions are not outside the predetermined range AI (No in step S107), that is, the blade edge positions are in the predetermined range AI, the processing unit 44 repeats step S105 and step S106. That is, the processing unit 44 continues displaying the blade edge trajectory TLi in the predetermined range AI based on the calculated blade edge positions until the blade edge positions go out of the predetermined range AI.

Figure 14:
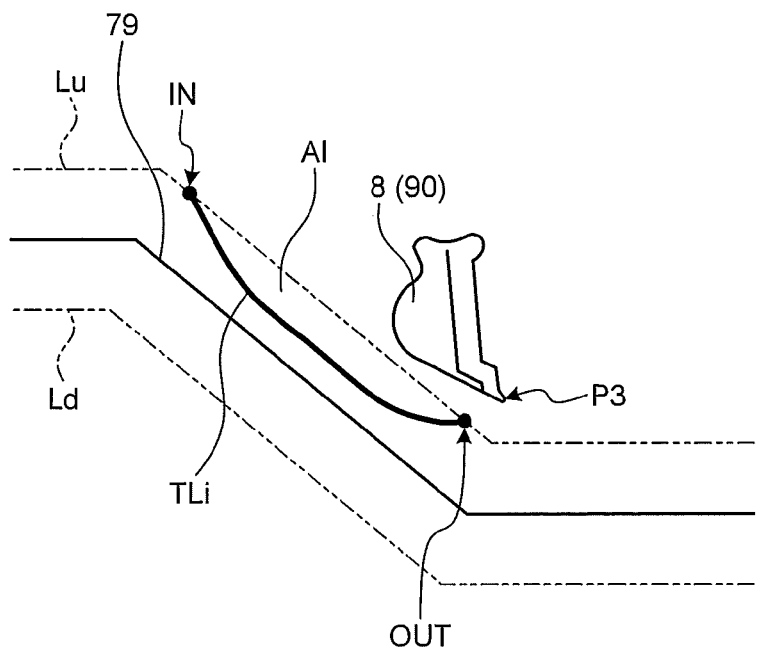
FIG. 14 is a view illustrating a state of the screen 42P of the display unit 42 which displays the blade edge trajectory TLi.

When the blade edge positions are outside the predetermined range AI (Yes in step S107), in step S108, the processing unit 44 stops displaying the trajectory of the blade edges P3 outside the predetermined range AI leaving the blade edge trajectory TLi in the predetermined range AI as illustrated in FIG. 14. In FIG. 14, an intersection point OUT of the blade edge trajectory TLi and the ground surface drawn line Lu on an end side of the blade edge trajectory TLi indicates the position at which the blade edges P3 of the bucket 8 go out of the predetermined range AI. In addition, as described above, the processing unit 44 may vary the mode of the trajectory of the blade edges P3 outside the predetermined range AI from that of the blade edge trajectory TLi in the predetermined range AI, and display the trajectory.

Figure 15:
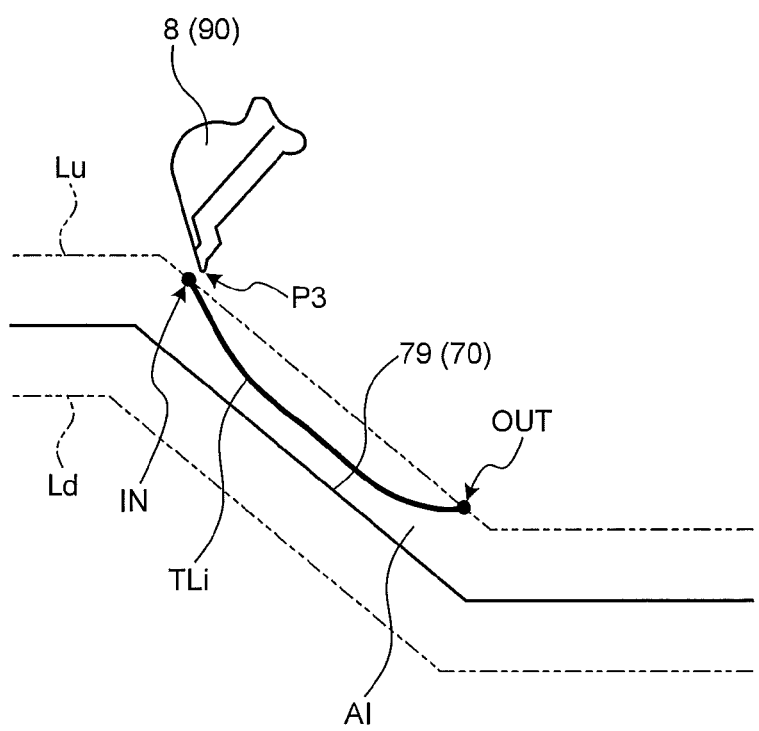
FIG. 15 is a view illustrating a state of the screen 42P of the display unit 42 which displays the blade edge trajectory TLi.

Next, erasing the blade edge trajectory TLi already displayed on the screen 42P of the display unit 42 in step S104 will be described. A case will be described as an example where the bucket 8 excavates a ground of an object to be worked once, and goes out of the predetermined range AI around the target surface 70. In this case, in above step S108, the screen 42P continues displaying the blade edge trajectory TLi in the predetermined range as illustrated in FIG. 15. When the vicinity of the target surface 70 is shoved again in this state, the bucket 8 comes close to the ground surface drawn line Lu near the target surface 70 (the target surface line 79 in FIG. 15) as illustrated in FIG. 15. Further, when, for example, at least part of the bucket 8, that is, the blade edges P3, passes the ground surface drawn line Lu and enters the predetermined range AI, the processing unit 44 erases the blade edge trajectory TLi displayed in the predetermined range AI, and displays the new blade edge trajectory TLi in the predetermined range AI from a state illustrated in FIG. 12.

Thus, when the bucket 8 (the blade edges P3 in this example) reenters the predetermined range AI after the bucket 8 (the blade edges P3 in this example) goes out of the predetermined range AI, the processing unit 44 erases the blade edge trajectory TLi which is already displayed. Further, the processing unit 44 displays the blade edge trajectory TLi of the bucket 8 which reentered the predetermined range AI, on the screen 42P of the display unit 42. When the bucket 8 excavates a ground of an object to be worked a plurality of times, if the previously displayed blade edge trajectory TLi is not erased, a plurality of blade edge trajectories TLi is displayed on the screen 42P, and therefore the operator of the excavator 100 has difficulty in viewing the blade edge trajectory TLi corresponding to the current excavation.

As described above, when the blade edge trajectory TLi corresponding to the second or subsequent excavation is displayed on the screen 42P, the processing unit 44 erases the previous blade edge trajectory TLi, so that the operator can reliably recognize the blade edge trajectory TLi corresponding to the current excavation. Further, every time the bucket 8 newly enters the predetermined range AI and the new blade edge trajectory TLi is displayed, the blade edge trajectory TLi which is already displayed is erased, so that data of the blade edge trajectory TLi which is already displayed is also erased from the memory unit 43 of the display control device 39. As a result, it is possible to prevent data of the blade edge trajectory TLi from occupying a memory area of the memory unit 43 and, consequently, efficiently and effectively utilize the memory unit 43, which is particularly effective when memory capacity of the memory unit 43 is small.

In the present embodiment, when the current target surface 70 is no longer an object to be worked or when the current target surface 70 is changed to another target surface, the processing unit 44 may erase, that is, reset, the blade edge trajectory TLi displayed on the screen 42P of the display unit 42. By so doing, when, for example, a ground of an object to be worked is changed, the previous blade edge trajectory TLi is reliably erased, so that it is possible to prevent the previous information from being mixed with the current blade edge trajectory TLi upon construction work of a new ground of an object to be worked.

Further, in the present embodiment, when the blade edge trajectory TLi is displayed in the predetermined range AI once, until the blade edges P3 of the bucket 8 reenters the predetermined range AI, the blade edge trajectory TLi continues to be displayed as long as the blade edge trajectory TLi is not reset. Consequently, the operator of the excavator 100 can reliably check the blade edge trajectory TLi displayed on the screen 42P. As a result, the operator can secure a sufficient time to check a construction work situation, check working procedure of excavation, check operation process of the bucket 8 or study the method of operating the bucket 8.

<Display of Blade Edge Trajectory TLi when Bucket 8 Moves>

Figure 16:
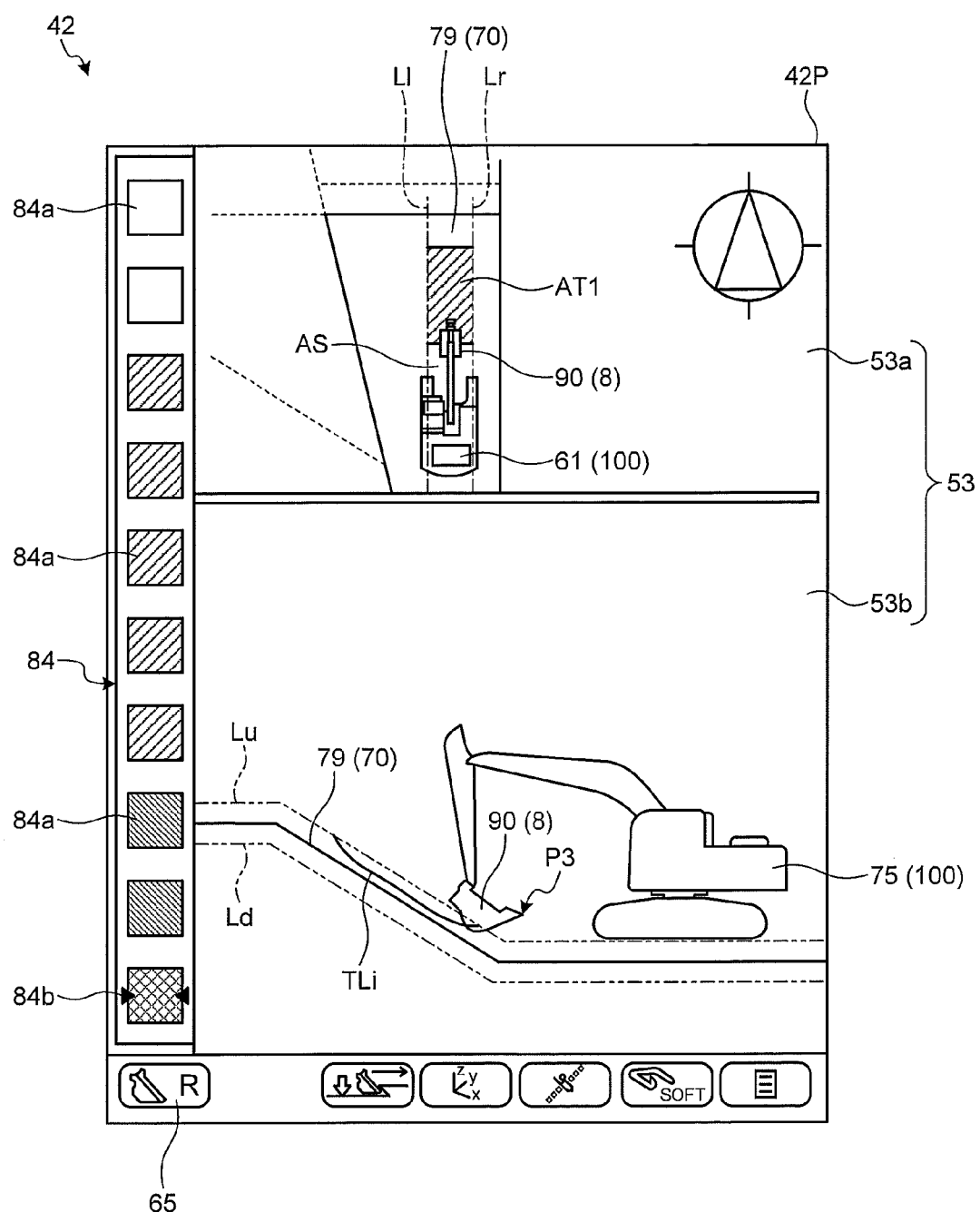
FIG. 16 is a view illustrating a display mode of the blade edge trajectory TLi.
Figure 17:
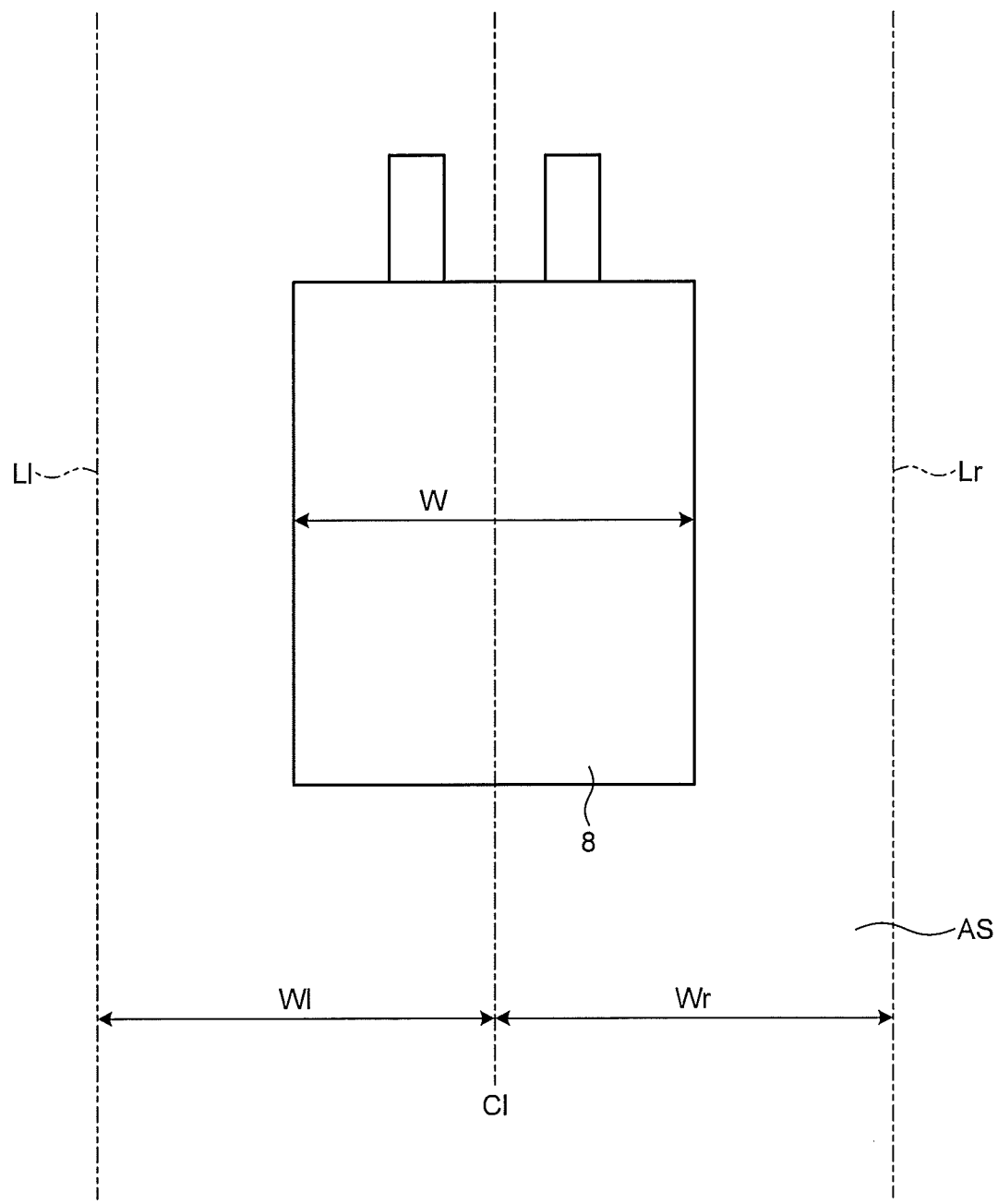
FIG. 17 is a view for describing a predetermined range which is a space which widens in a direction vertical to a target surface 70, and which includes an excavation range of the target surface 70 by the bucket 8.
Figure 18:
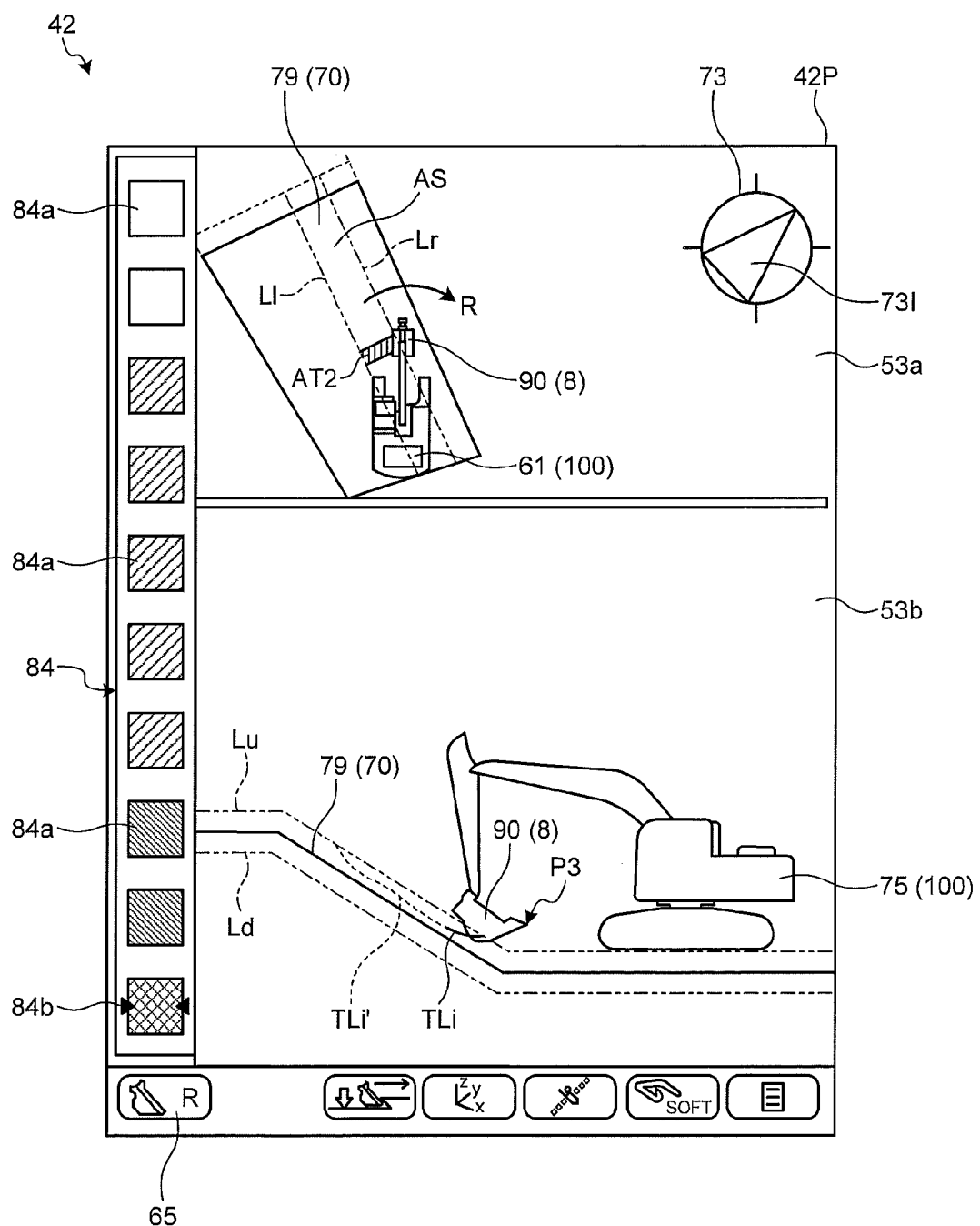
FIG. 18 is a view illustrating a display mode of the blade edge trajectory TLi when the bucket 8 moves.

FIG. 16 is a view illustrating a display mode of the blade edge trajectory TLi. FIGS. 17, 23-1 and 23-2 are views for describing a predetermined range which is a space which widens in a direction vertical to the target surface 70, and which includes an excavation range of the target surface 70 by the bucket 8. FIG. 18 is a view illustrating a display mode of the blade edge trajectory TLi when the bucket 8 moves. Although the blade edge trajectory TLi is displayed on the rough excavation screen 53 in this example, the blade edge trajectory TLi may be displayed on the fine excavation screen 54. In the present embodiment, the processing unit 44 of the display control device 39 illustrated in FIG. 4 erases at least part of the blade edge trajectory TLi when at least part of the bucket 8 (icon 90) goes out from a range AS which is a space which widens in a direction vertical to the target surface 70 and which is defined as a predetermined range (adequately referred to as a "horizontal direction predetermined range" below) including the excavation range of the target surface 70 by the bucket 8.

Figure 21:
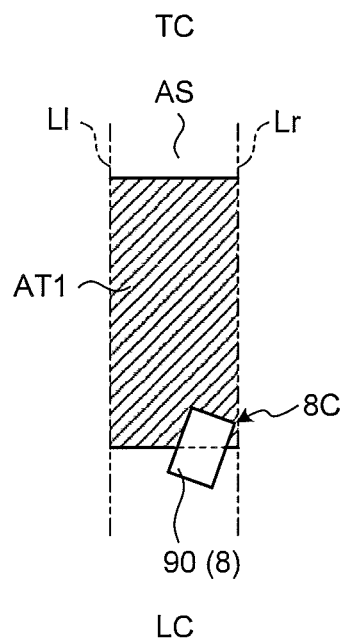
Figure 22:
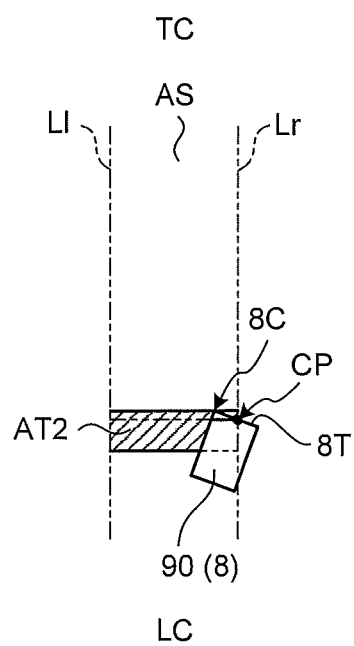
Figures 1, 23:
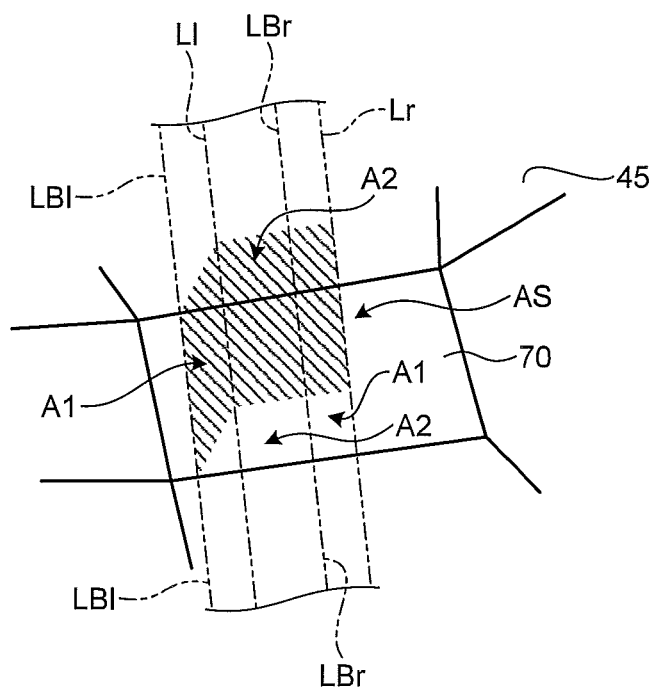
Figures 2, 23:
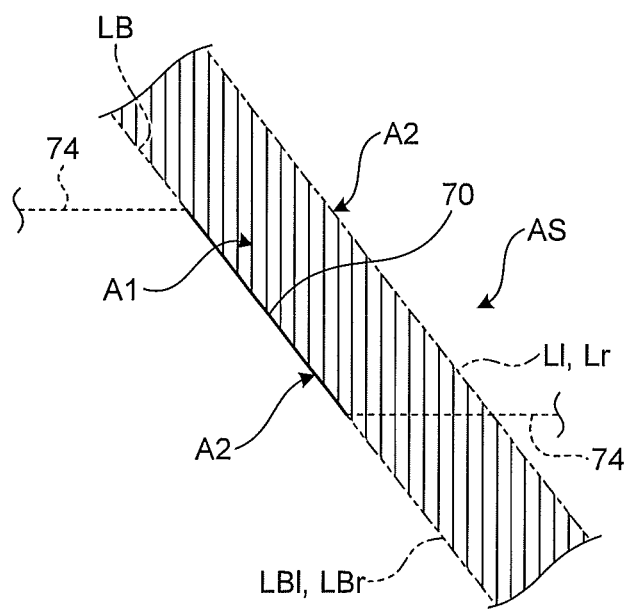

As illustrated in FIGS. 23-1 and 23-2, an area surrounded by lines LB1 and LBr which pass in the target surface 70 and boundary drawn line Ll and the boundary drawn line Lr which are parallel to the target surface 70 and are parallel to the lines LB1 and LBr is defined as the "horizontal direction predetermined range AS". That is, the horizontal direction predetermined range AS is an area of a rectangular parallelepiped or a cube and is a space which widens in a direction vertical to the target surface 70, and A2 illustrated in FIG. 23-1 (a range sandwiched by the boundary drawn line Ll and the boundary drawn line Lr and an area sandwiched by the line LB1 and the line LBr) are top and bottom surfaces of the rectangular parallelepiped or the cube and the target surface 70 and the range sandwiched by the boundary drawn line Ll and the boundary drawn line Lr as illustrated in FIGS. 23-1 and 23-2 are two opposing side surfaces A1 of the rectangular parallelepiped or the cube. Further, the horizontal direction predetermined range AS illustrated in FIGS. 16, 18, and 20 to 22 is expressed as a bird view when this horizontal direction predetermined range AS is seen from above of the excavator 100. The range (A2) sandwiched by the boundary drawn line Ll and the boundary drawn line Lr is an excavation range of the target surface 70. Although a range of the horizontal direction predetermined range AS overlapping the target surface 70 is hatched in FIG. 23-1, the range of the horizontal direction predetermined range AS is not limited in a direction in which the lines LB1 and LBr and the boundary drawn lines Ll and Lr extend.

That is, the horizontal direction predetermined range AS illustrated in the top view 53a in FIG. 16 is a space which widens in the direction vertical to the target surface 70, includes both sides of the bucket 8 which excavates the target surface 70 in the width direction and a range (horizontal direction predetermined range AS) surrounded by the boundary drawn lines Ll and Lr set on both sides of the bucket 8 in the width direction as illustrated in the top view 53a illustrated in FIG. 16. The horizontal direction predetermined range AS includes a range of the target surface 70 to be excavated by the bucket 8.

Further, the horizontal direction predetermined range AS will be described in detail. As illustrated in FIG. 17, the horizontal direction predetermined range AS is a range spaced distances Wl and Wr apart from a center axis Cl of the bucket 8 in the width direction toward the left side and the right side of the bucket 8 in the width direction. A line which is spaced the distance Wl apart from the center axis Cl of the bucket 8 in the width direction toward the left side in the width direction and which is parallel to the center axis Cl in the width direction is the boundary drawn line Ll. Further, a line which is spaced the distance Wr apart from the center axis Cl of the bucket 8 in the width direction toward the right side in the width direction and which is parallel to the center axis Cl in the width direction is the boundary drawn line Lr. Although the lengths of the distances Wr and Wl are not limited in particular, the sum of the distances Wr and Wl (Wr+Wl) is larger than a width (maximum width) W of the bucket 8. In the present embodiment, the distances Wr and Wl and the width W of the bucket 8 are set equal (Wr=Wl=W). That is, the sum of the distances Wr and Wl is twice the width W of the bucket 8 (Wl+Wr=2×W). Further, the lengths of the distances Wr and Wl may be variable.

The side view 53b in FIG. 16 illustrates the blade edge trajectory TLi in the predetermined range AI. An area AT1 which is hatched in the horizontal direction predetermined range AS in the top view 53a is an area in which the blade edge trajectory TLi is displayed in the predetermined range AI (the same applies below). When the predetermined range AI and the horizontal direction predetermined range AS are simultaneously set when the target surface 70 is set, and are stored in the memory unit 43 of the display control device 39 illustrated in FIG. 4. The horizontal direction predetermined range AS is set by, for example, position information (for example, the coordinates in the global coordinate system COG) about the boundary drawn lines Ll and Lr being stored in the memory unit 43. In the present embodiment, the predetermined range AI and the horizontal direction predetermined range AS which are set once are maintained until the current target surface 70 is no longer an object to be worked or the target surface 70 is changed to another target surface.

FIG. 18 illustrates a state where the excavator 100 (the icons 61 and 75 in FIGS. 16 and 18) rotates in a right direction (a direction indicated by an arrow R) from the state illustrated in FIG. 16. Corresponding to this rotation, the positional relationship between the bucket 8 of the excavator 100 and the target surface 70 changes, and then the pointer 731 of the target surface facing compass 73 displayed in the top view 53a also rotates.

As illustrated in the side view 53b in FIG. 18, when at least part of the bucket 8 goes out of the horizontal direction predetermined range AS following rotation of the excavator 100, the processing unit 44 erases at least part of the blade edge trajectory TLi according to the positional relationship between the bucket 8 and the horizontal direction predetermined range AS. In FIG. 18, the erased portion of the blade edge trajectory TLi is indicated by a dotted line which is assigned a reference numeral TLi'. How the positional relationship between the bucket 8 and the horizontal direction predetermined range AS is taken into account to erase part of the blade edge trajectory TLi will be described below in detail. As illustrated in FIG. 18, TLi' of the blade edge trajectory TLi is erased, and the blade edge trajectory TLi is displayed. Following this, the size of the area AT2 (see FIG. 18) hatched in the horizontal direction predetermined range AS in the top view 53a also becomes small compared to the horizontal direction predetermined AS in which the entire bucket 8 is included (the area AT2 illustrated in FIG. 18). When the excavator 100 rotates in the left direction from this state and the entire bucket 8 enters the horizontal direction predetermined range AS, the processing unit 44 returns the blade edge trajectory TLi to the original state. That is, the processing unit 44 displays the entire blade edge trajectory TLi. As a result, the blade trajectories TLi' and TLi illustrated in FIG. 18 are entirely displayed as the blade edge trajectory TLi. In addition, when the entire bucket 8 goes out of the horizontal direction predetermined range AS, display of the entire blade edge trajectory TLi is erased. In addition, although a case has been described with the present embodiment where the entire excavator 100 rotates, the same applies to a case where the traveling device 5 is not operated and only the upper swing body 3 rotates.

By so doing, when the operator of the excavator 100 performs an operation other than excavation, by at least part of the blade edge trajectory TLi being erased, display which is irrelevant to an excavation operation is not displayed on the screen 42P. As a result, it is possible to reduce the likelihood that the operator who checks the screen 42P of the display unit 42 has a bothersome impression. An operation other than excavation means, for example, rotating the excavator 100 to load dirt excavated by the bucket 8 to, for example, a dump track. Next, processing process of display control of the blade edge trajectory TLi when the bucket 8 moves will be described.

Figure 19:
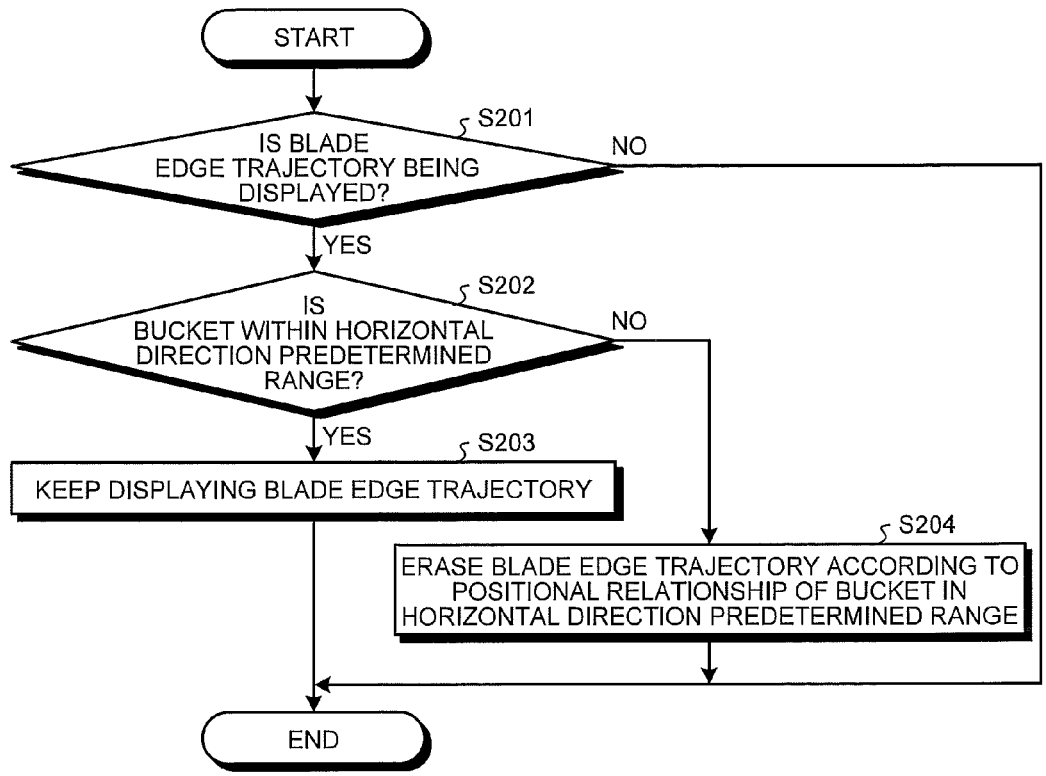
FIG. 19 is a flowchart illustrating an example of processing process of display control of the blade edge trajectory TLi when the bucket 8 moves.
Figure 20:
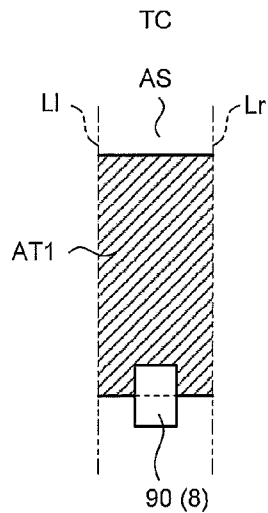

The relationship between the bucket 8 and the horizontal direction predetermined range AS will be described using FIGS. 19 to 22, 24-1 and 24-2. FIG. 19 is a flowchart illustrating an example of processing process of display control of the blade edge trajectory TLi when the bucket 8 moves. FIGS. 20 to 22, 24-1 and 24-2 are views illustrating relationships between the bucket 8 and the horizontal direction predetermined range AS. A reference numeral LC in FIGS. 20 to 22, 24-1 and 24-2 indicates the excavator 100 side, and a reference numeral TC indicates a direction in which the boom 6 of the work equipment 2 of the excavator 100 is oriented and is a side apart from the excavator 100. In step S201, while the blade edge trajectory TLi is displayed on the screen 42P of the display unit 42 (Yes in step S201), the processing unit 44 of the display control device 39 illustrated in FIG. 4 advances processing to step S202. When the blade edge trajectory TLi is not displayed on the screen 42P of the display unit 42 (No in step S201), the processing unit 44 finishes display control of the blade edge trajectory TLi.

In step S202, the processing unit 44 calculates the current position of the bucket 8, and decides whether or not the calculated current position of the bucket 8 is in the horizontal direction predetermined range AS. The current position of the bucket 8 can be calculated using the above method of calculating the positions of the blade edges P3 of the bucket 8. That is, the coordinates of the blade edges P3 only need to be replaced with a coordinate of a position of the bucket 8 which needs to be calculated.

When the bucket 8 is in the horizontal direction predetermined range AS (Yes in step S202), the processing unit 44 advances processing to step S203. For example, FIGS. 20, 21, 24-1 and 24-2 illustrate that the bucket 8 is in the horizontal direction predetermined range AS. FIG. 21 illustrates a state where a corner portion 8C of the bucket 8 is in contact with the boundary drawn line Lr on the right side of the bucket 8. Also in this case, the bucket 8 is in the horizontal direction predetermined range as long as the bucket 8 does not go beyond the boundary drawn line Lr. In such a case, in step S203, the processing unit 44 keeps displaying the blade edge trajectory TLi as is.

When the current position of the bucket 8 is not in the horizontal direction predetermined range AS, that is, the current position is outside the horizontal direction predetermined range AS (No in step S202), the processing unit 44 advances processing to step S204. For example, FIG. 22 illustrates that the bucket 8 is outside the horizontal direction predetermined range AS. In this case, an end portion 8T of the bucket 8 crosses the boundary drawn line Lr on the right side of the bucket 8, and part of the bucket 8 is outside the horizontal direction predetermined range AS. In this case, in step S204, the processing unit 44 erases the blade edge trajectory TLi according to the positional relationship with respect to the bucket 8 in the horizontal direction predetermined range AS.

A range erased by the processing unit 44 when the processing unit 44 erases at least part of the blade edge trajectory TLi will be described using FIG. 22. As described above, part of the bucket 8 is outside the horizontal direction predetermined range AS in the example illustrated in FIG. 22. In this case, based on a position (the corner portion 8C of the bucket 8 on the reference numeral TC side in this example) of a portion in the horizontal direction predetermined range AS which is the farthest apart from the excavator 100, the processing unit 44 erases the portion of the blade edge trajectory TLi which is farther part from the excavator 100 than this position. Further, based on a position CP at which the end portion 8T crosses the boundary drawn line Lr on the right side of the bucket 8, the processing unit 44 may erase the portion of the blade edge trajectory TLi which is farther apart from the excavator 100 than this position.

An area AT2 hatched in the horizontal direction predetermined range AS illustrated in FIG. 22 is an area in which the blade edge trajectory TLi is indicated in the predetermined range AI. In this example, based on the position CP instead of the corner portion 8C of the bucket 8, the length of the area AT2 in the direction in which the boundary drawn lines Ll and Lr extend is shorter and the length of the blade edge trajectory TLi displayed on the screen 42P of the display unit 42 is shorter.

Figures 1, 24:
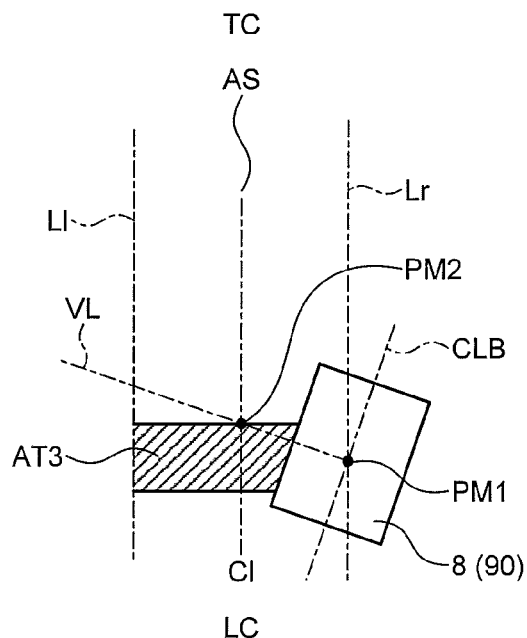
Figures 2, 24:
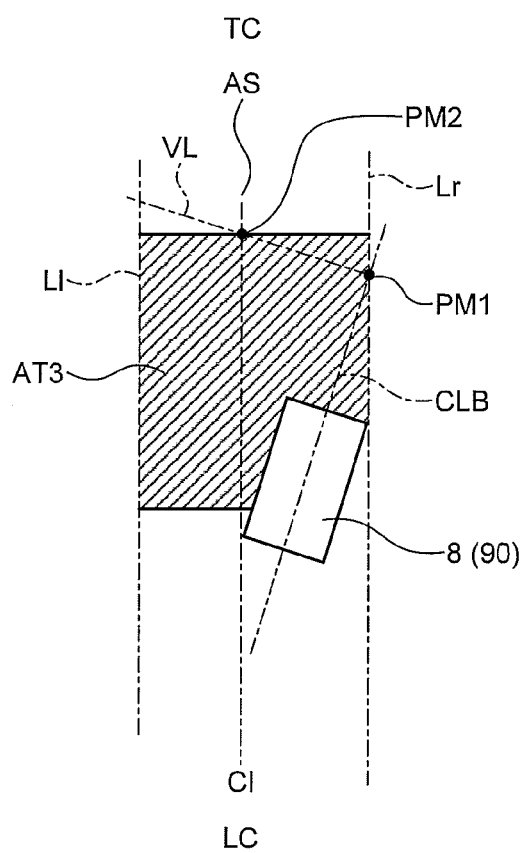

Further, another example will be described where the processing unit 44 erases at least part of the blade edge trajectory TLi. Hereinafter, a range to erase the blade edge trajectory TLi will be described using FIGS. 24-1 and 24-2. While FIG. 24-1 illustrates that part of the bucket 8 is outside the horizontal direction predetermined range AS, even if the bucket 8 is not outside the horizontal direction predetermined range AS as illustrated in FIG. 24-2, at least part of the blade edge trajectory TLi can be erased according to processing described below.

The processing unit 44 performs the following processing to erase at least part of the blade edge trajectory TLi. The processing unit 44 first calculates an intersection point PM1 of the boundary drawn line Lr and a center line CLB of the bucket 8 in the width direction. Next, the processing unit 44 draws a vertical line VL with respect to the center line CLB from the intersection point PM1 on this boundary drawn line Lr. Further, the processing unit 44 calculates an intersection point PM2 of the center axis Cl of the bucket 8 in the width direction and the vertical line VL. As a result, based on a position (the intersection point PM2 in this example) of a portion in the horizontal direction predetermined range AS which is the farthest apart from the excavator 100, the processing unit 44 erases the portion of the blade edge trajectory TLi which is farther apart from the excavator 100 than this position. An area AT3 hatched in the horizontal direction predetermined range AS illustrated in FIGS. 24-1 and 24-2 is an area in which the blade edge trajectory TLi is indicated in the predetermined range AI.

Although at least part of the blade edge trajectory TLi is erased based on whether or not at least part of the bucket 8 is in the horizontal direction predetermined range AS in the present embodiment, conditions to erase at least part of the blade edge trajectory TLi are not limited to this. Conditions to erase at least part of the blade edge trajectory TLi may include, for example, that the upper swing body 3 of the excavator 100 rotates or the vehicle main body 1 of the excavator moves (including rotation at the same position or movement to a different position). Although the position of the bucket 8 needs to be calculated to decide whether or not at least part of the bucket 8 is in the horizontal direction predetermined range AS, the rotation of the upper swing body 3 and the movement of the excavator 100 can be acquired from vehicle information of the excavator 100 (for example, rotation position information obtained from a rotation position detection sensor which is not illustrated) and therefore the position of the bucket 8 does not need to be calculated. Consequently, by including rotation of the upper swing body 3 or movement of the excavator 100 into conditions to erase at least part of the blade edge trajectory TLi, it is easy to decide these conditions.

A dimension Wr+Wl of the horizontal direction predetermined range AS in the width direction illustrated in FIG. 17 is greater than the width W of the bucket 8, and is twice in the present embodiment, the dimension is not limited to this. Due to, for example, vibration of the excavator 100 or slight rotation of the upper swing body 3, at least part of the bucket 8 goes out of the horizontal direction predetermined range AS and then immediately returns to the horizontal direction predetermined range AS in some cases. In this case, if the dimension Wr+Wl is made the same as the width W of the bucket 8, there is a likelihood that erasure and display of at least part of the blade edge trajectory TLi are frequently switched, thereby making the operator of the excavator 100 feel bothersome. By making the dimension Wr+Wl greater than the width W of the bucket 8, it is possible to reduce the above frequency of switching. By making the dimension Wr+Wl twice the width W of the bucket 8 or more and, more preferably, twice, it is possible to prevent at least part of the blade edge trajectory TLi from being frequently erased and switched.

Although the present embodiment has been described above, the above content by no means limits the present embodiment. Further, the above components incorporate components which one of ordinary skill in art can easily arrive at, which are the substantially same and which are in an equivalent scope. Furthermore, the above components can be adequately combined. Still further, the components can be variously removed, replaced or changed without deviating from the spirit of the present embodiment.

For example, content of each guidance screen is not limited to the above and may be adequately changed. Further, part or all of functions of the display control device 39 may be executed by a computer provided outside the excavator 100. Furthermore, a target object to be worked is not limited to the above surface, and may be a point, a line or a three-dimensional shape. The input unit 41 of the display input device 38 is not limited to a touch panel type, and may be formed with operation members such as hard keys and switches.

Although the work equipment 2 has the boom 6, the arm 7 and the bucket 8 are provided in the above embodiment, the work equipment 2 is not limited to this and only needs to have at least the bucket 8. Further, although the first stroke sensor 16, the second stroke sensor 17 and the third stroke sensor 18 detect tilt angles of the boom 6, the arm 7 and the bucket 8 in the above embodiment, a detection unit which detects tilt angles is not limited to these. For example, angle sensors which detect tilt angles of the boom 6, the arm 7 and the bucket 8 may be provided.

Although the bucket 8 is provided in the above embodiment, the bucket is not limited to this and may be a tilt bucket. The tilt bucket is a bucket which has a bucket tilt cylinder, which molds and level an inclined surface or a flat surface into a desirable shape by tilting the bucket to the left and the right even when an excavator is on a titled surface, and which can also perform a rolling compaction operation using a bottom plate.

REFERENCE SIGNS LIST

1 Vehicle Main Body
2 Work equipment
3 Upper Swing Body
4 Cab
5 Traveling device
8 Bucket
8B Blade
19 Position Detection Unit
21, 22 Antenna
23 Three-dimensional Position Sensor
24 Tilt Angle Sensor
28 Display system of Excavating machine (Display System)
38 Display Input Device
39 Display Control Device
41 Input Unit
42 Display Unit
42P Screen
43 Memory Unit
44 Processing Unit
45 Design Surface
46 Sound Generating Device
70 Target Surface
78 Line (Target Surface Line)
79 Target Surface Line
84 Graphic Information
100 Hydraulic excavator
AI Predetermined Range
AS Horizontal Direction Predetermined Range
AT1, AT2 Area
Ld Underground Drawn Line
Ll, Lr Boundary Drawn Line
Lu Ground Surface Drawn Line
P3 Blade Edge
TLe Out-Of-Range Trajectory
TLi Blade Edge Trajectory

The invention claimed is:

1. A display system of an excavating machine, the excavating machine comprising a work equipment including a bucket, a position detection unit, and a main body which is attached to the work equipment, the display system comprising:
 a vehicle condition detection unit, including the position detection unit, which detects information related to a current position and a posture of the excavating machine;
 a memory unit which stores position information of a design surface of an object to be worked and position information of a target surface indicating a target shape;
 a display unit which displays the bucket and position information of the design surface and the target surface, on a screen; and
 a processing unit which calculates a position of a blade edge of the bucket based on the information related to the current position and the posture of the excavating machine, and, when at least part of the bucket enters a predetermined range in a periphery of the target surface in a direction orthogonal to the target surface, displays a trajectory of the blade edge which is calculated based on the position of the blade edge and which exists in the predetermined range, on the screen of the display unit.

2. The display system of the excavating machine according to claim 1, wherein,
 when the bucket reenters the predetermined range after the bucket goes out of the predetermined range, the processing unit erases the trajectory of the blade edge which has already been displayed, and displays on the screen the trajectory of the blade edge of the bucket which has reentered the predetermined range.

3. The display system of the excavating machine according to claim 1, wherein,
 based on a positional relationship between the bucket and a predetermined range which is a space which widens in a direction vertical to the target surface and includes an excavation range by the bucket, the processing unit erases at least part of the trajectory.

4. The display system of the excavating machine according to claim 3, wherein the predetermined range which includes the excavation range is larger than a width of the bucket.

5. The display system of the excavating machine according to claim 1, wherein,
 based on rotation of an upper swing body on which the work equipment is mounted, the processing unit erases at least part of the trajectory.

6. The display system of the excavating machine according to claim 1, wherein,
 based on movement of the main body, the processing unit erases at least part of the trajectory.

7. The display system of the excavating machine according to claim 1, wherein,
 when target surface is no longer an object to be worked or when the target surface is changed, the processing unit erases the trajectory displayed on the screen of the display unit.

8. The display system of the excavating machine according to claim 1, wherein a size of the predetermined range is changeable.

9. The display system of the excavating machine according to claim 8, wherein the size of the predetermined range comprises a size corresponding to a tolerance when construction work is conducted according to the design surface.

10. The display system of the excavating machine according to claim 1, wherein,
 based on a distance between the blade edge of the bucket and the target surface or the design surface, the processing unit broadcasts a sound as an alarm.

11. The display system of the excavating machine according to claim 10, wherein,
 based on a distance between the blade edge of the bucket and the target surface or the design surface, the processing unit changes a mode of broadcasting the sound.

12. The display system of the excavating machine according to claim 1, wherein the processing unit displays a guidance indicator which indicates the position of the blade edge of the bucket, on the screen of the display unit.

13. An excavating machine comprising a display system of an excavating machine, the excavating machine comprising a work equipment including a bucket and a main body which is attached to the work equipment, the display system comprising:
 a vehicle condition detection unit which detects information related to a current position and a posture of the excavating machine;

a memory unit which stores position information of a design surface of an object to be worked and position information of a target surface indicating a target shape;

a display unit which displays the bucket and position information of the design surface and the target surface, on a screen; and a processing unit which calculates a position of a blade edge of the bucket based on the information related to the current position and the posture of the excavating machine, and, when at least part of the bucket enters a predetermined range in a periphery of the target surface in a direction orthogonal to the target surface, displays a trajectory of the blade edge which is calculated based on the position of the blade edge and which exists in the predetermined range, on the screen of the display unit.

* * * * *

UNITED STATES PATENT AND TRADEMARK OFFICE
CERTIFICATE OF CORRECTION

| | | |
|---|---|---|
| PATENT NO. | : 9,043,098 B2 | Page 1 of 1 |
| APPLICATION NO. | : 13/985451 | |
| DATED | : May 26, 2015 | |
| INVENTOR(S) | : Azumi Nomura et al. | |

It is certified that error appears in the above-identified patent and that said Letters Patent is hereby corrected as shown below:

Title page, item (72) 2nd inventor should read: Takahiro Hashimoto, Hiratsuka, Japan Signed and Sealed this
Twelfth Day of April, 2016

Michelle K. Lee
*Director of the United States Patent and Trademark Office*